(12) United States Patent
Chen et al.

(10) Patent No.: US 7,756,213 B2
(45) Date of Patent: Jul. 13, 2010

(54) METHOD FOR ENHANCING BLUETOOTH TRANSMISSION SPEED AND ROBUSTNESS OF EMITTING END AND RECEIVING END OF COMMUNICATION SYSTEM

(75) Inventors: Albert Chen, Hsin-Chu (TW); Kuang-Ping Ma, Hsin-Chu (TW); Wen-Tso Huang, Hsin-Chu (TW)

(73) Assignee: Integrated System Solution Corp., Hsin-Chu (TW)

( * ) Notice: Subject to any disclaimer, the term of this patent is extended or adjusted under 35 U.S.C. 154(b) by 797 days.

(21) Appl. No.: 11/652,514

(22) Filed: Jan. 12, 2007

(65) Prior Publication Data

US 2007/0165742 A1 Jul. 19, 2007

(30) Foreign Application Priority Data

Jan. 13, 2006 (TW) .............................. 95101518 A

(51) Int. Cl.
*H04L 27/18* (2006.01)
(52) U.S. Cl. ....................................................... 375/279
(58) Field of Classification Search ................. 375/279, 375/280, 281, 282, 283, 295, 308, 329, 330, 375/331, 332, 333; 329/304; 332/103
See application file for complete search history.

(56) References Cited

U.S. PATENT DOCUMENTS 5,422,913 A 6/1995 Wilkinson
6,888,905 B1 5/2005 Cheah et al.
7,394,869 B2 * 7/2008 Jensen et al. ................. 375/302
7,415,078 B2 * 8/2008 Smit, Gerrit ................. 375/330
2004/0165576 A1 8/2004 Reunamaki
2004/0252788 A1 * 12/2004 Smit .......................... 375/329
2005/0259768 A1 11/2005 Yang et al.
2006/0013339 A1 * 1/2006 Salloum Salazar .......... 375/329
2006/0093070 A1 * 5/2006 Ibrahim et al. .............. 375/324

OTHER PUBLICATIONS

Office Action from the Republic of China International Patent Office dated Oct. 5, 2009.
B.K. Poh, et al., "A High Data Rate MDPSK Receiver Architecture for Indoor Wireless Application", IEEE 2002, pp. 1718-1721.
Dieter Brückmann et al., "A CPFSK/PSK-Phase Reconstruction-Receiver for Enhanced Data Rate Bluetooth Systems", IEEE 2004, pp. 334-337.
Bo Xia et al., "A GFSK Demodulator for Low-IF Bluetooth Receiver", IEEE Journal of Solid-State Circuits, vol. 38, No. 8, Aug. 2003, pp. 1397-1400.

* cited by examiner

*Primary Examiner*—Sam K Ahn
(74) *Attorney, Agent, or Firm*—Stites & Harbison PLLC; Juan Carlos A. Marquez, Esq.

(57) ABSTRACT

A method for enhancing the Bluetooth transmission speed and robustness of an emitting end and a receiving end is provided. The method is utilized in a system having an emitting end and a receiving end, wherein at least one of the emitting and receiving ends is provided with BlueSPEED-PSK or BlueSPEED-DELTA-PSK (adapted Gray coded D16PSK) modulation with optional FEC.

10 Claims, 24 Drawing Sheets

| Bit 3 | Bit 2 | Bit 1 | Phase |
|---|---|---|---|
| 0 | 0 | 0 | 0 |
| 0 | 0 | 1 | +1/4 * PI |
| 0 | 1 | 1 | +2/4 * PI |
| 0 | 1 | 0 | +3/4 * PI |
| 1 | 1 | 0 | +4/4 * PI |
| 1 | 1 | 1 | -3/4 * PI |
| 1 | 0 | 1 | -2/4 * PI |
| 1 | 0 | 0 | -1/4 * PI |

FIG.3A

| Bit 4 | Bit 3 | Bit 2 | Bit 1 | Phase |
|---|---|---|---|---|
| 0 | 0 | 0 | 0 | 0 |
| 0 | 0 | 0 | 1 | +1/8 * PI |
| 0 | 0 | 1 | 1 | +2/8 * PI |
| 0 | 0 | 1 | 0 | +3/8 * PI |
| 0 | 1 | 1 | 0 | +4/8 * PI |
| 0 | 1 | 1 | 1 | +5/8 * PI |
| 0 | 1 | 0 | 1 | +6/8 * PI |
| 0 | 1 | 0 | 0 | +7/8 * PI |
| 1 | 1 | 0 | 0 | +8/8 * PI |
| 1 | 1 | 0 | 1 | -7/8 * PI |
| 1 | 1 | 1 | 1 | -6/8 * PI |
| 1 | 1 | 1 | 0 | -5/8 * PI |
| 1 | 0 | 1 | 0 | -4/8 * PI |
| 1 | 0 | 1 | 1 | -3/8 * PI |
| 1 | 0 | 0 | 1 | -2/8 * PI |
| 1 | 0 | 0 | 0 | -1/8 * PI |

FIG.4A

| Bit 4 | Bit 3 | Bit 2 | Bit 1 | Phase |
|---|---|---|---|---|
| 0 | 0 | 0 | 0 | -1/16 * PI |
| 0 | 0 | 0 | 1 | +1/16 * PI |
| 0 | 0 | 1 | 1 | +3/16 * PI |
| 0 | 0 | 1 | 0 | +5/16 * PI |
| 0 | 1 | 1 | 0 | +7/16 * PI |
| 0 | 1 | 1 | 1 | +9/16 * PI |
| 0 | 1 | 0 | 1 | +11/16 * PI |
| 0 | 1 | 0 | 0 | +13/16 * PI |
| 1 | 1 | 0 | 0 | +15/16 * PI |
| 1 | 1 | 0 | 1 | -15/16 * PI |
| 1 | 1 | 1 | 1 | -13/16 * PI |
| 1 | 1 | 1 | 0 | -11/16 * PI |
| 1 | 0 | 1 | 0 | -9/16 * PI |
| 1 | 0 | 1 | 1 | -7/16 * PI |
| 1 | 0 | 0 | 1 | -5/16 * PI |
| 1 | 0 | 0 | 0 | -3/16 * PI |

FIG.7A

| Bit 4 | Bit 3 | Bit 2 | Bit 1 | Phase |
|---|---|---|---|---|
| 0 | 0 | 0 | 0 | -1/32 * PI |
| 0 | 0 | 0 | 1 | +1/32 * PI |
| 0 | 0 | 1 | 1 | +7/32 * PI |
| 0 | 0 | 1 | 0 | +9/32 * PI |
| 0 | 1 | 1 | 0 | +15/32 * PI |
| 0 | 1 | 1 | 1 | +17/32 * PI |
| 0 | 1 | 0 | 1 | +23/32 * PI |
| 0 | 1 | 0 | 0 | +25/32 * PI |
| 1 | 1 | 0 | 0 | +31/32 * PI |
| 1 | 1 | 0 | 1 | -31/32 * PI |
| 1 | 1 | 1 | 1 | -25/32 * PI |
| 1 | 1 | 1 | 0 | -23/32 * PI |
| 1 | 0 | 1 | 0 | -17/32 * PI |
| 1 | 0 | 1 | 1 | -15/32 * PI |
| 1 | 0 | 0 | 1 | -9/32 * PI |
| 1 | 0 | 0 | 0 | -7/32 * PI |

FIG.9C

US 7,756,213 B2

METHOD FOR ENHANCING BLUETOOTH TRANSMISSION SPEED AND ROBUSTNESS OF EMITTING END AND RECEIVING END OF COMMUNICATION SYSTEM

CROSS-REFERENCE TO RELATED APPLICATIONS

This non-provisional application claims priority under 35 U.S.C. §119(a) on Patent Application No(s). 095101518 filed in Taiwan, R.O.C. on Jan. 13, 2006, the entire contents of which are hereby incorporated by reference.

BACKGROUND

1. Field of Invention

The invention relates to a Bluetooth modulation method, and more particularly, to a method for enhancing the Bluetooth transmission speed and robustness of an emitting end and a receiving end of a communication system.

2. Related Art

Presently, in the technical specification of the fundamental Bluetooth data transmission, the data transmission speed may reach an upper limit of $1 \times 10^6$ bits/sec (1 Mbps) in case Gaussian Frequency Shift Keying (GFSK) is utilized. The data transmission speed may reach $2 \times 10^6$ bits/sec (2 Mbps) in case Differential Quadrature Phase Shift Keying (DQPSK) is used. Moreover, the data transmission speed may reach $3 \times 10^6$ bits/sec (3 Mbps) in case Differential 8-Phase Shift Keying (D8PSK) is utilized.

The afore-mentioned highest data transmission speed is achieved without utilizing Forward Error Correction (FEC) techniques, which are widely utilized in the various digital data communication systems for eliminating the effects of noise. However, if FEC is utilized, the actual data transmission speed will be significantly reduced.

Presently, the upper limit of Bluetooth transmission speed is 3 Mbps. In the multipath transmission over a wireless channel, FEC must be incorporated to ensure the integrity and correctness of the transmitted data, however, in doing so, the data transmission speed will be reduced below 3 Mbps. Due to the fact that the various existing technologies complying with the Bluetooth transmission protocol are not capable of solving this problem and can't raise its data transmission speed, the research and development of a technology that could be used to raise the data transmission speed and improve its robustness is one of the most important tasks in this field.

SUMMARY OF THE INVENTION

According to one aspect of the invention, a method of enhancing the Bluetooth transmission speed and robustness of the emitting end and the receiving end of a communication system by adopting BlueSPEED-PSK or BlueSPEED-DELTA-PSK (adapted Gray-coded D16PSK) modulation with optional FEC on at least one of the emitting and receiving ends.

Accordingly, it is an object of the present invention to provide a method of enhancing the Bluetooth transmission speed of the emitting end and the receiving end of a communication system for increasing the data transmission speed.

Another object of the present invention is to provide a method of enhancing the Bluetooth transmission robustness of the emitting end and the receiving end of a communication system.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given below for illustration only, and thus is not limitative of the present invention, wherein:

FIG. 3A is a table indicating the relations between the bits and phases of the symbols of Bluetooth communications utilizing the modulation technology of D8PSK;

FIG. 4A is a table indicating the relations between the bits and phases of the symbols of the modulation technology of D16PSK;

FIG. 7A is a table indicating the relations between the bits and phases of the symbols of the BlueSPEED modulation technology of BlueSPEED-PSK (D16PSK rotated by $-\pi/16$);

FIG. 9C is a table indicating example relations between the bits and phases of the symbols of BlueSPEED-DELTA-PSK using Delta =½;

DETAILED DESCRIPTION OF THE INVENTION

The purpose, construction, features, and functions of the invention can be appreciated and understood more thoroughly through the following detailed description with reference to the attached drawings.

The invention relates to a method of enhancing the Bluetooth transmission speed and robustness of an emitting end and a receiving end of a communication system, wherein an adapted Differentially 16-Phase Shift Keying (D16PSK) modulation technology is utilized. This technology is referred to as BlueSPEED and is considered as an quasi-backward compatible extension of the existing Bluetooth technology. In the invention, this kind of technology is disposed in a communication system having an emitting end and a receiving end wherein at least one of the emitting and receiving ends is provided with BlueSPEED technology.

Figure 1A:
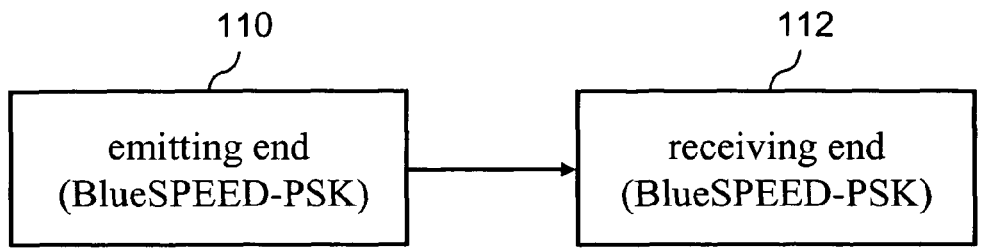
FIG. 1A is a system architect diagram of the first embodiment of the present invention.
Figure 1B:
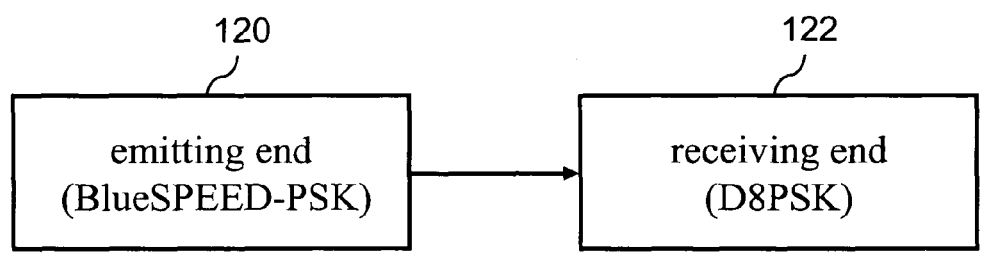
FIG. 1B is a system architect diagram of the second embodiment of the present invention.

Referring to FIG. 1A, it is a system architect diagram of the first embodiment of the present invention, wherein BlueSPEED technology is utilized at an emitting end 110 and a receiving end 112 as a modulating and de-modulating means. Referring to FIG. 1B, it is a system architect diagram of the second embodiment of the present invention, wherein BlueSPEED technology is utilized at an emitting end 120 as a modulating means and D8PSK is utilized at a receiving end 122 as a de-modulating means. Then, referring to FIG. 1C, it is a system architect diagram of the third embodiment of the present invention, wherein D8PSK is utilized at an emitting end 130 as a modulating means and BlueSPEED technology is utilized at a receiving end 132 as a de-modulating means. Then, referring to FIG. 1D, it is a system architect diagram related to the present invention, wherein D8PSK is utilized at an emitting end 140 as a modulating means and D8PSK is utilized at a receiving end 142 as a de-modulating means.

Figure 2A:
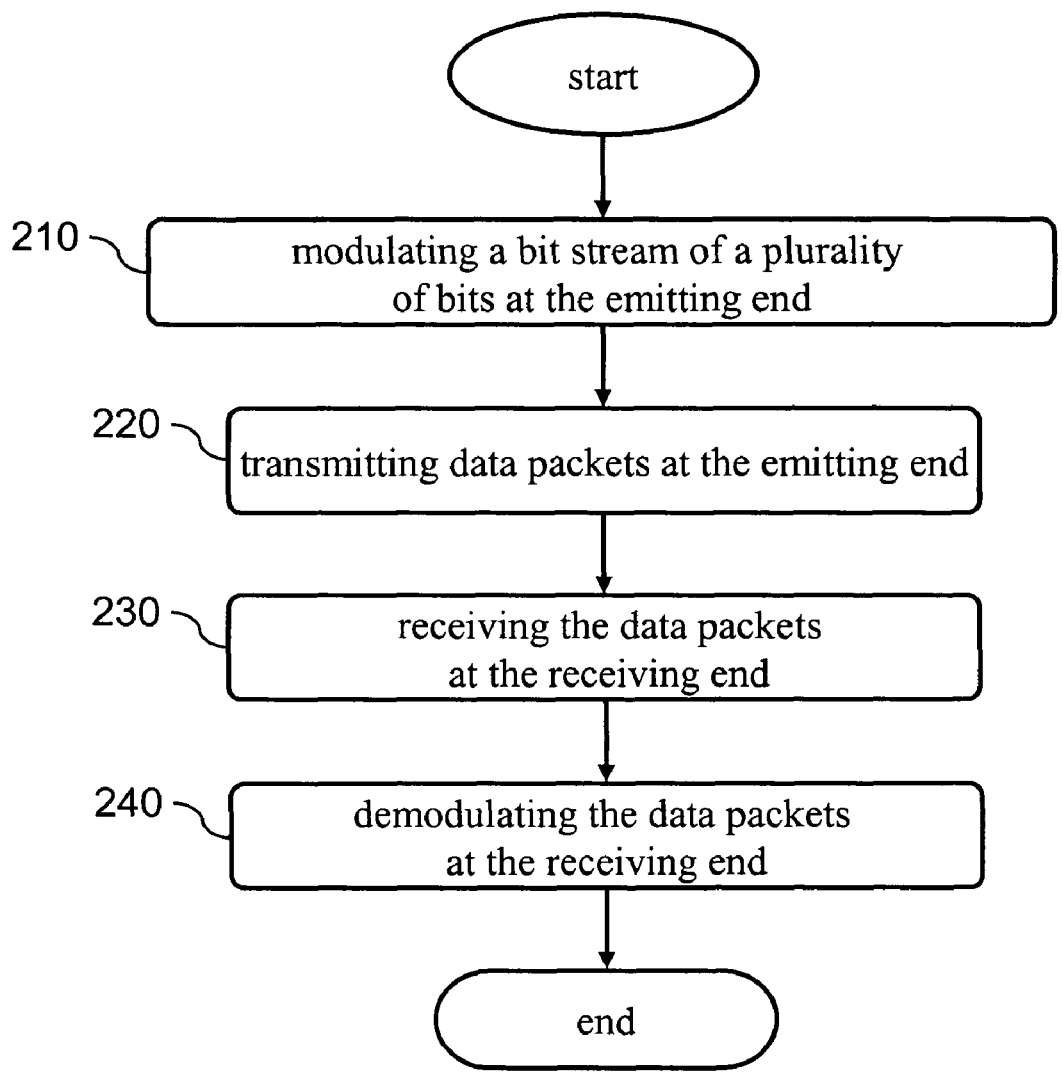
FIG. 2A is a flowchart showing the steps of a method for enhancing the Bluetooth transmission speed and robustness of an emitting end and a receiving end of a communication system according to the present invention.

Then, referring to FIG. 2A, it is a flowchart showing the steps of a method for enhancing the Bluetooth transmission of an emitting end and a receiving end of a communication system of the invention. Firstly, modulate at the emitting end a bit stream containing a plurality of bits (step 210). Next, transmit data packets at the emitting end (step 220). The data packets contain the related phase information of the modulated bit stream. Then, receive the data packets at the receiving end (step 230). And finally, demodulate the data packets at the receiving end (step 240).

Figure 2B:
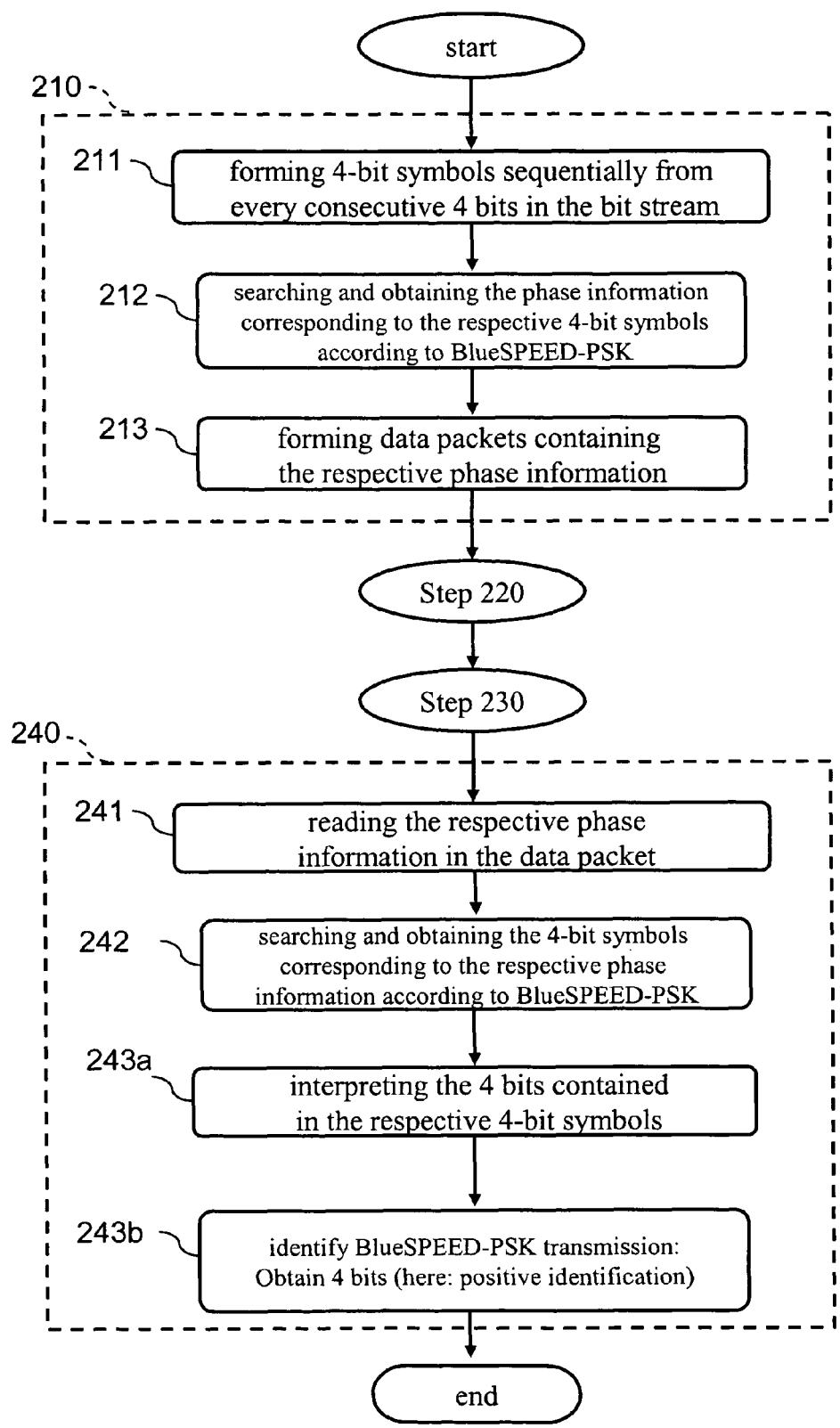
FIG. 2B is a flowchart showing the steps of the first embodiment of the present invention.

Referring to FIG. 2B, it is a flowchart showing the steps of a method for enhancing the Bluetooth transmission of the emitting end and the receiving end of a communication system according to the first embodiment of the invention applied to the system of FIG. 1A, wherein BlueSPEED technology is utilized at the emitting end and the receiving end as a signal modulation means and signal demodulation means. In the first embodiment, the step of modulating at the emitting end a bit stream containing a plurality of bits (step 210) includes the following steps: Firstly, form 4-bit symbols sequentially from every consecutive 4 bits in the bit stream (step 211). Next, search and obtain the phase information corresponding to the respective 4-bit symbols according to the BlueSPEED technology (step 212). Then, form data packets containing the respective phase information (step 213). Subsequently, transmit the data packets containing the phase information at the emitting end (step 220). Then, receive the data packets at the receiving end (step 230). And finally, de-modulate the data packets at the receiving end (step 240). The step 240 further includes the following steps: Firstly, reading the respective phase information in the data packet (step 241). Next, search and obtain the 4-bit symbols corresponding to the respective phase information according to the BlueSPEED technology (step 242). Next, interpret the 4 bits contained in the respective 4-bit symbols (step 243a). Finally, (here: positively) identify a BlueSPEED technology transmission (step 243b) and declare all 4 bits as being valid.

Figure 2C:
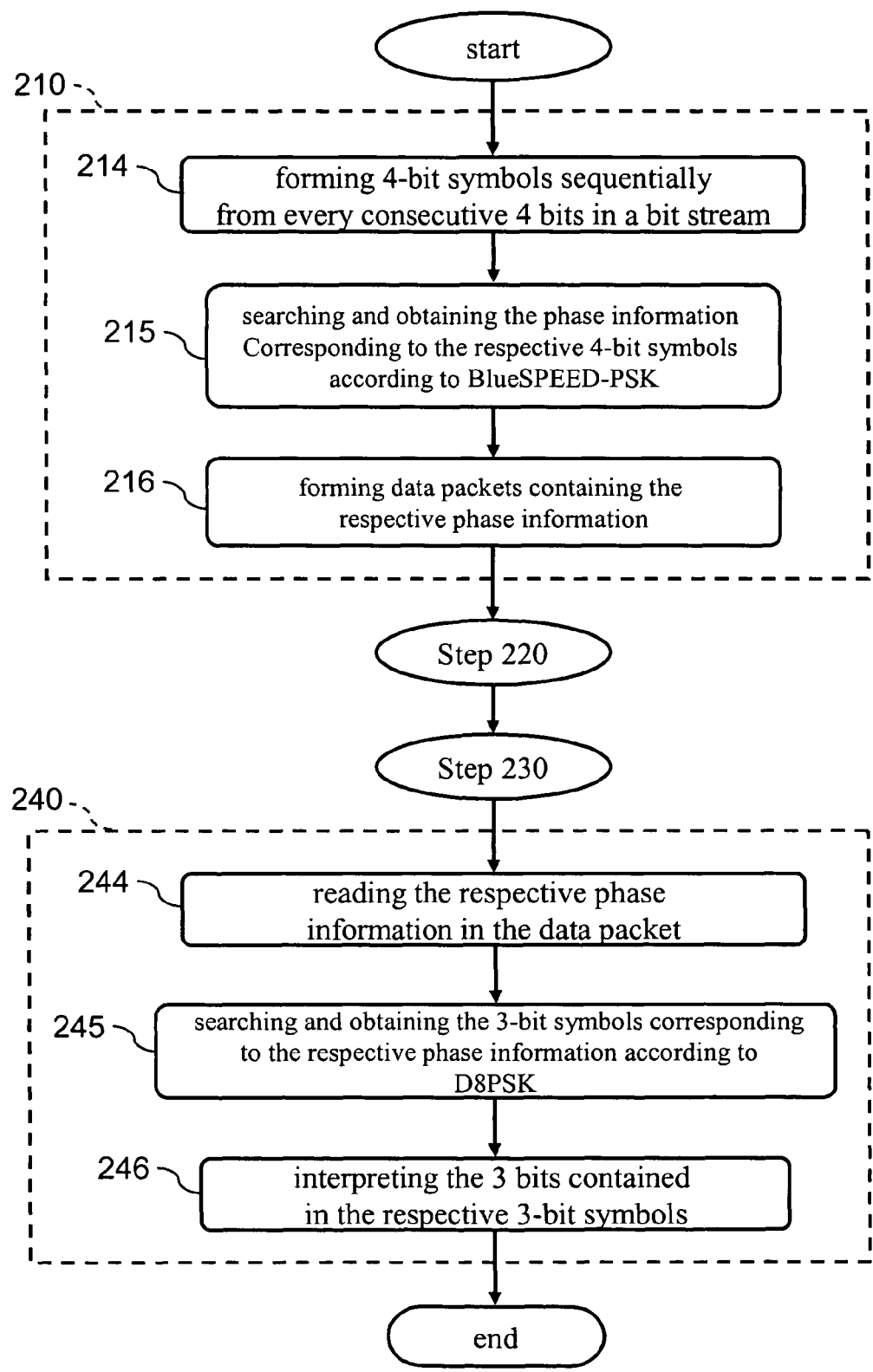
FIG. 2C is a flowchart showing the steps of the second embodiment of the present invention.

Moreover, referring to FIG. 2C, it is a flowchart showing the steps of a method for enhancing the Bluetooth transmission of an emitting end and a receiving end of a communication system according to the second embodiment of the present invention, which is applied to the system of FIG. 1B, wherein BlueSPEED technology is utilized at the emitting end as a signal modulation means and D8PSK is utilized at the receiving end as a signal demodulation means. In the second embodiment, the step of modulating at the emitting end a bit stream containing a plurality of bits (step 210) includes the following steps: Firstly, form 4-bit symbols sequentially from every consecutive 4 bits in the bit stream (step 214). Next, search and obtain the phase information corresponding to the respective 4-bit symbols according to BlueSPEED technology (step 215). Then, form data packets containing the respective phase information (step 216). Subsequently, transmit the data packets containing the phase information at the emitting end (step 220). Then, receive the data packets at the receiving end (step 230). And finally, de-modulate the data packets at the receiving end (step 240). The step 240 further includes the following steps: Firstly, read the respective phase information in the data packet (step 244). Next, search and obtain the 3-bit symbols corresponding to the respective phase information according to the D8PSK (step 245). And finally, interpret the 3 bits contained in the respective 3-bit symbols (step 246). The 3 bits in the respective 3-bit symbols are the same as the 3 MSB bits of the respective 4-bit symbols.

Figure 1C:
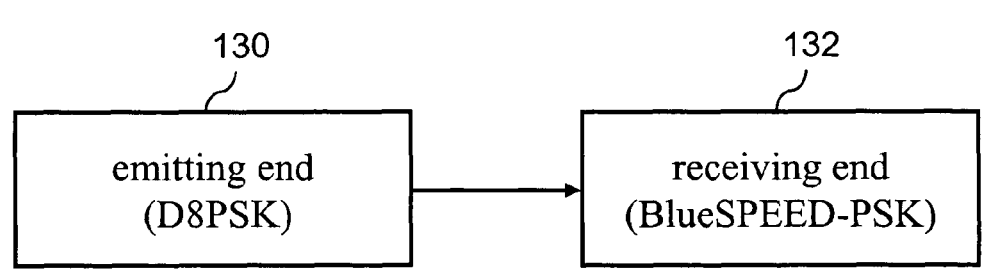
FIG. 1C is a system architect diagram of the third embodiment of the present invention.
Figure 2D:
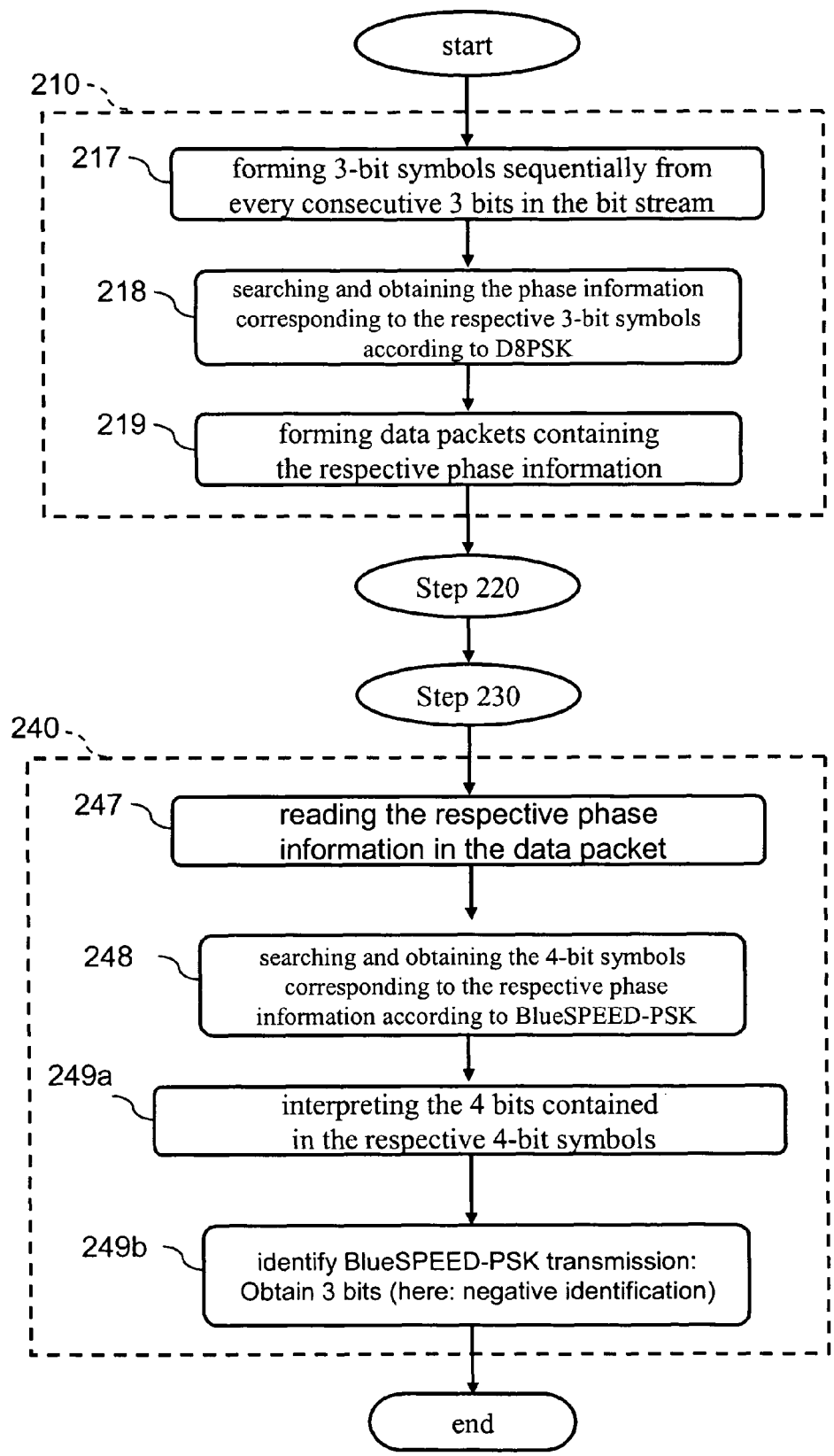
FIG. 2D is a flowchart showing the steps of the third embodiment of the present invention.

Furthermore, referring to FIG. 2D, it is a flowchart showing the steps of a method for enhancing the Bluetooth transmission of an emitting end and a receiving end of a communication system according to the third embodiment of the invention, which is applied to the system of FIG. 1C, wherein D8PSK is utilized at the emitting end as a signal modulation means and BlueSPEED technology is utilized at the receiving end as a signal demodulation means. In the third embodiment, the step of modulating at the emitting end a bit stream containing a plurality of bits (step 210) includes the following steps: Firstly, form 3-bit symbols sequentially from every consecutive 3 bits in the bit stream (step 217). Next, search and obtain the phase information corresponding to the respective 3-bit symbols according to D8PSK (step 218). Then, form data packets containing the respective phase information (step 219). Subsequently, transmit the data packets containing the phase information at the emitting end (step 220). Then, receive the data packets at the receiving end (step 230). And finally, demodulate the data packets at the receiving end (step 240), including the following steps: Firstly, read the respective phase information in the data packet (step 247). Next, search and obtain the 3-bit symbols corresponding to the respective phase information according to the BlueSPEED technology (step 248). Next, interpret the 4 bits contained in the respective 4-bit symbols (step 249a). Finally, (here: negatively) identify a BlueSPEED technology transmission (step 249b) and declare only 3 bits as being valid (3 MSBs of the respective 4-bit symbols).

Figure 1D:
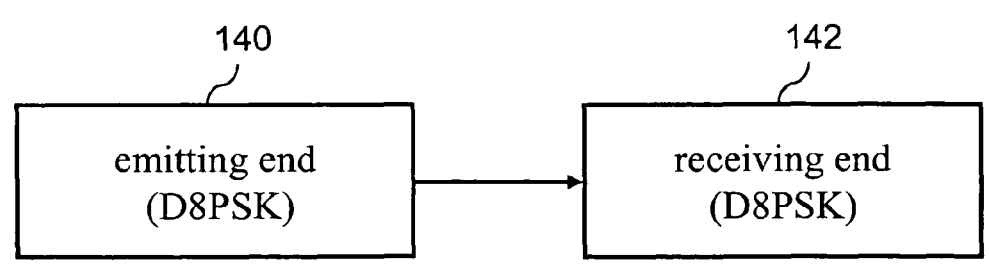
FIG. 1D is a system architect diagram related the present invention.
Figure 2E:
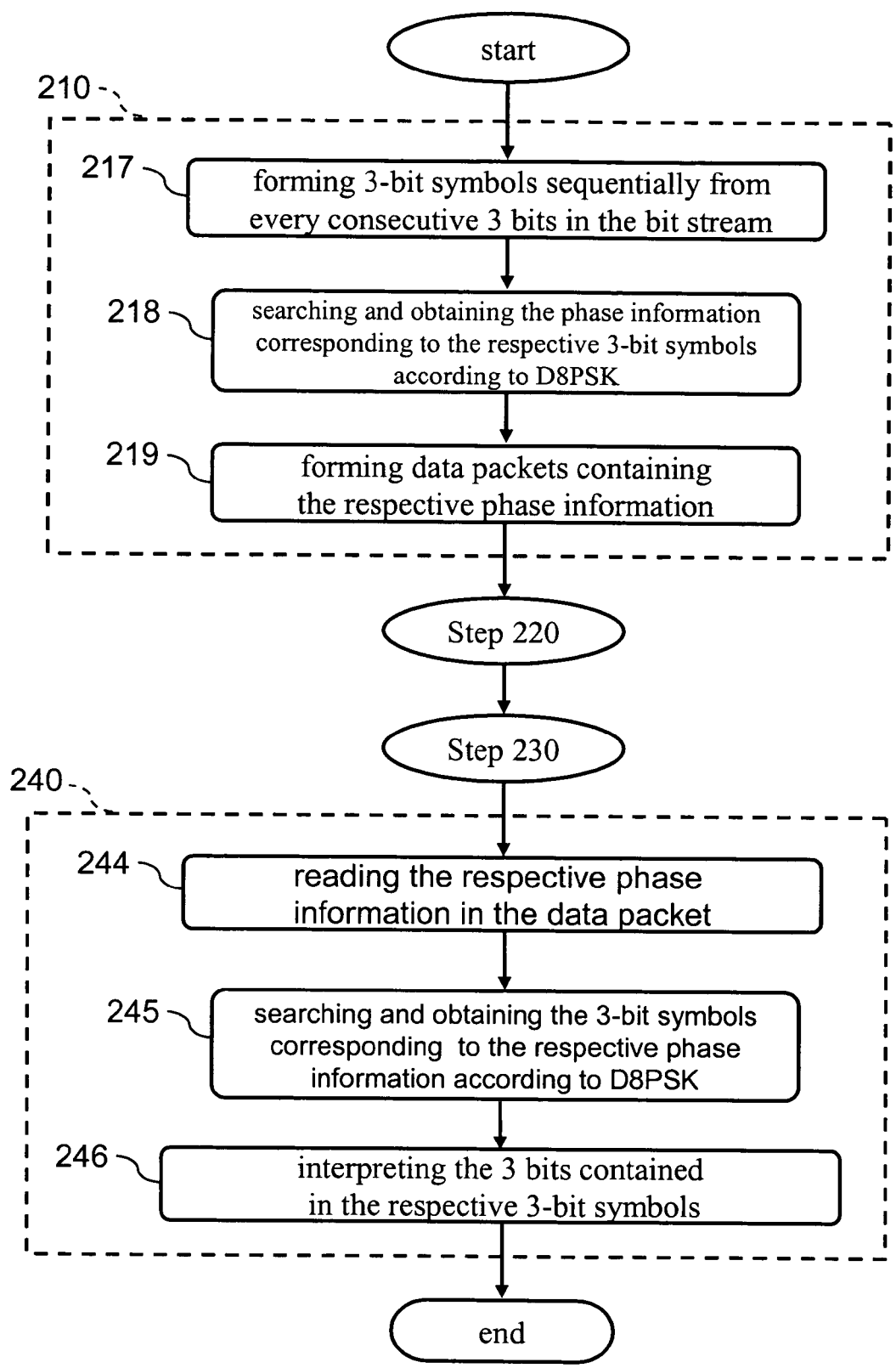
FIG. 2E is a flowchart showing the steps of a procedure related to the present invention.

Furthermore, referring to FIG. 2E, it is a flowchart showing the steps of Bluetooth transmission of an emitting end and a receiving end of a communication system, which is applied to the system of FIG. 1D, wherein D8PSK is utilized at the emitting end as a signal modulation means and D8PSK is utilized at the receiving end as a signal demodulation means. The step of modulating at the emitting end a bit stream containing a plurality of bits (step 210) includes the following steps: Firstly, form 3-bit symbols sequentially from every consecutive 3 bits in the bit stream (step 217). Next, search and obtain the phase information corresponding to the respective 3-bit symbols according to D8PSK (step 218). Then, form data packets containing the respective phase information (step 219). Subsequently, transmit the data packets containing the phase information at the emitting end (step 220). Then, receive the data packets at the receiving end (step 230). And finally, de-modulate the data packets at the receiving end (step 240). The step 240 further includes the following steps: Firstly, read the respective phase information in the data packet (step 244). Next, search and obtain the 3-bit symbols corresponding to the respective phase information according to the D8PSK (step 245). And finally, interpret the 3 bits contained in the respective 3-bit symbols (step 246).

Figure 3B:
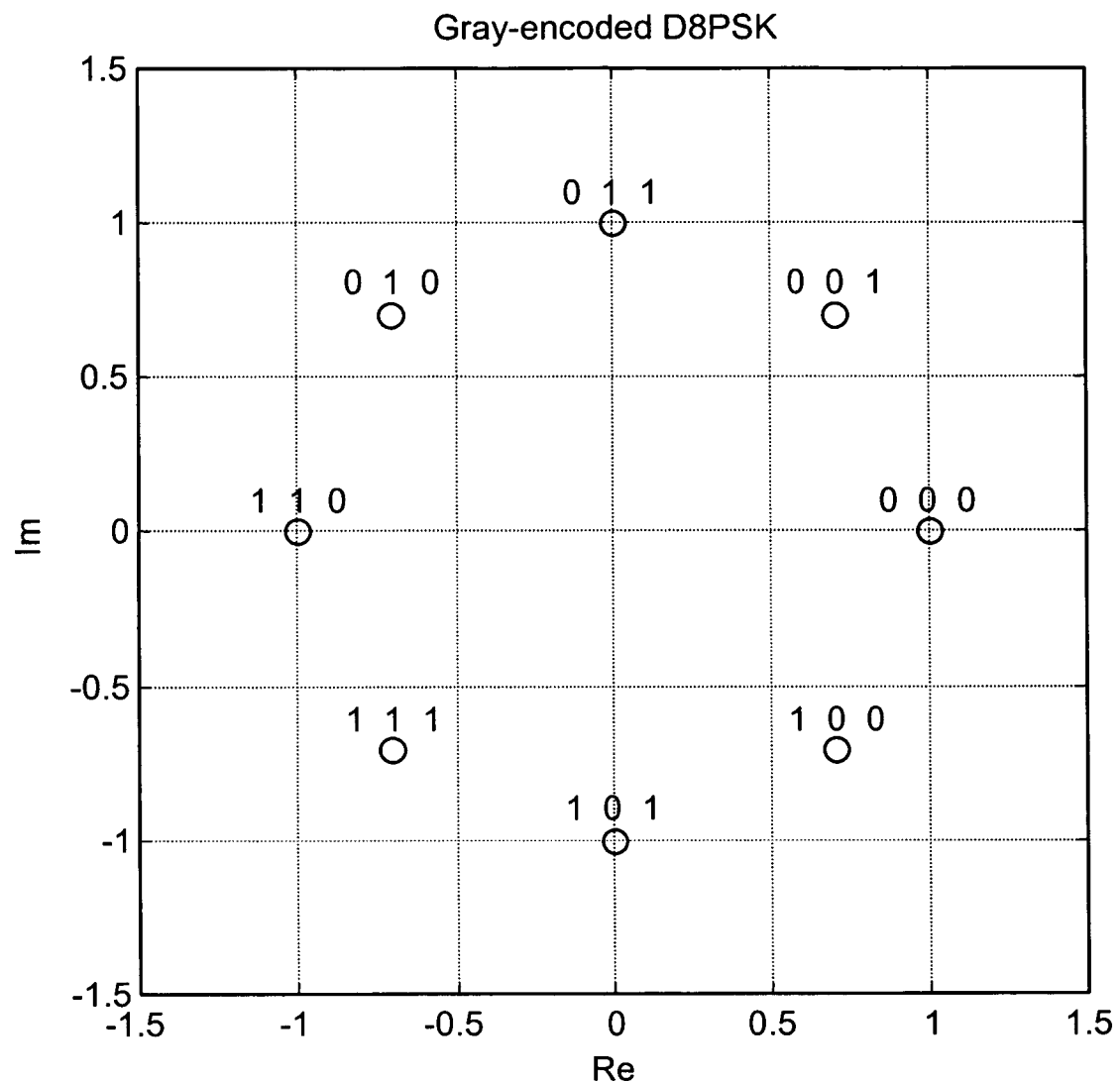
FIG. 3B is a symbol distribution constellation of Bluetooth communications obtained by utilizing the modulation technology of D8PSK.
Figure 4B:
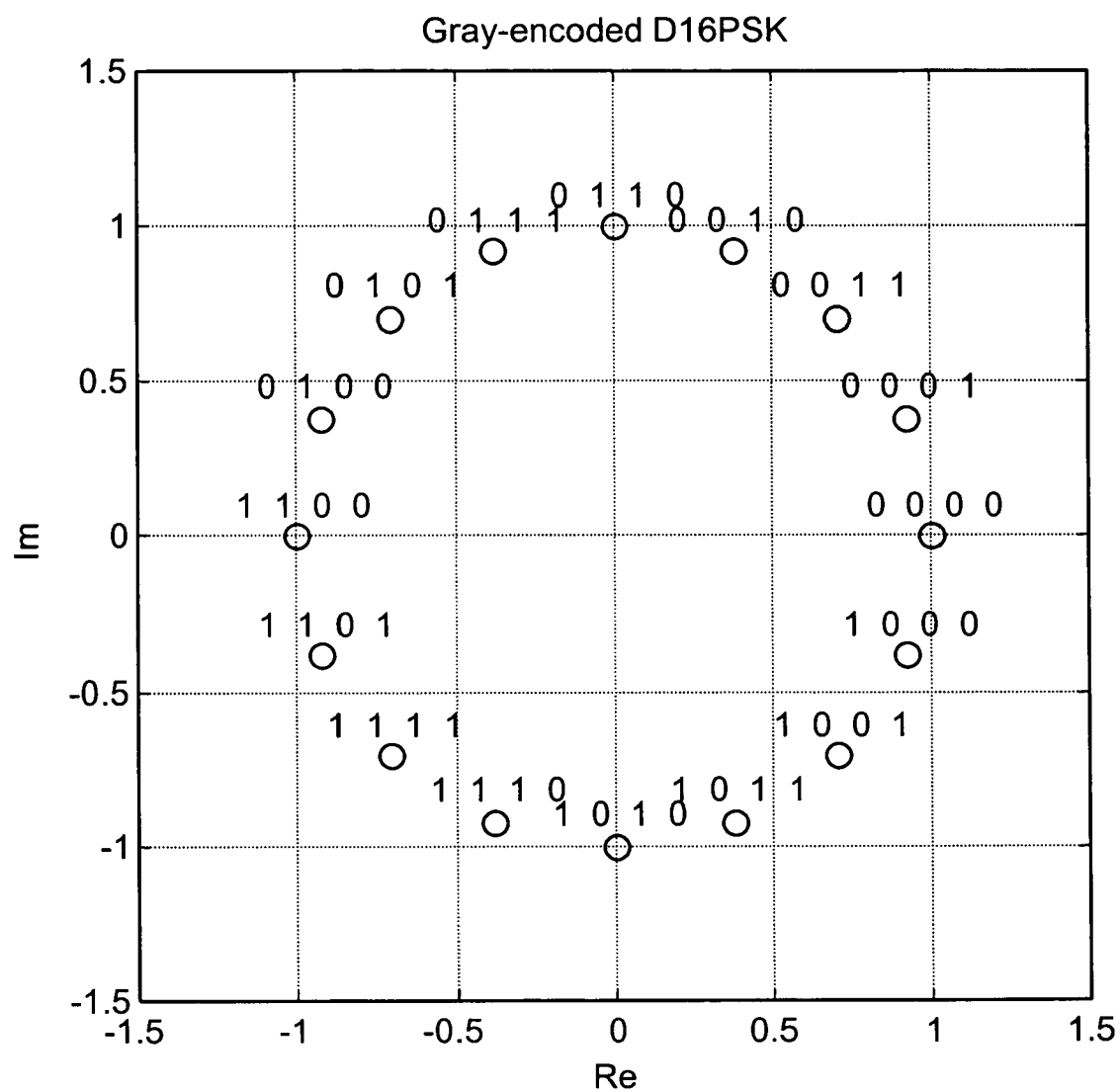
FIG. 4B is a symbol distribution constellation obtained by utilizing the modulation technology of D16PSK.

Then, refer to FIGS. 3A and 3B. FIG. 3A is a table indicating the relations between the bits and phases of the symbols of Bluetooth communications, utilizing the modulation technology of D8PSK. FIG. 3B is a symbol distribution constellation of Bluetooth communications obtained by utilizing the modulation technology of D8PSK. Furthermore, refer to FIGS. 4A and 4B. FIG. 4A is a table indicating the relations between the bits and phases of the symbols of the modulation technology of D16PSK. FIG. 4B is a symbol distribution constellation of the modulation technology of D16PSK.

Figure 5:
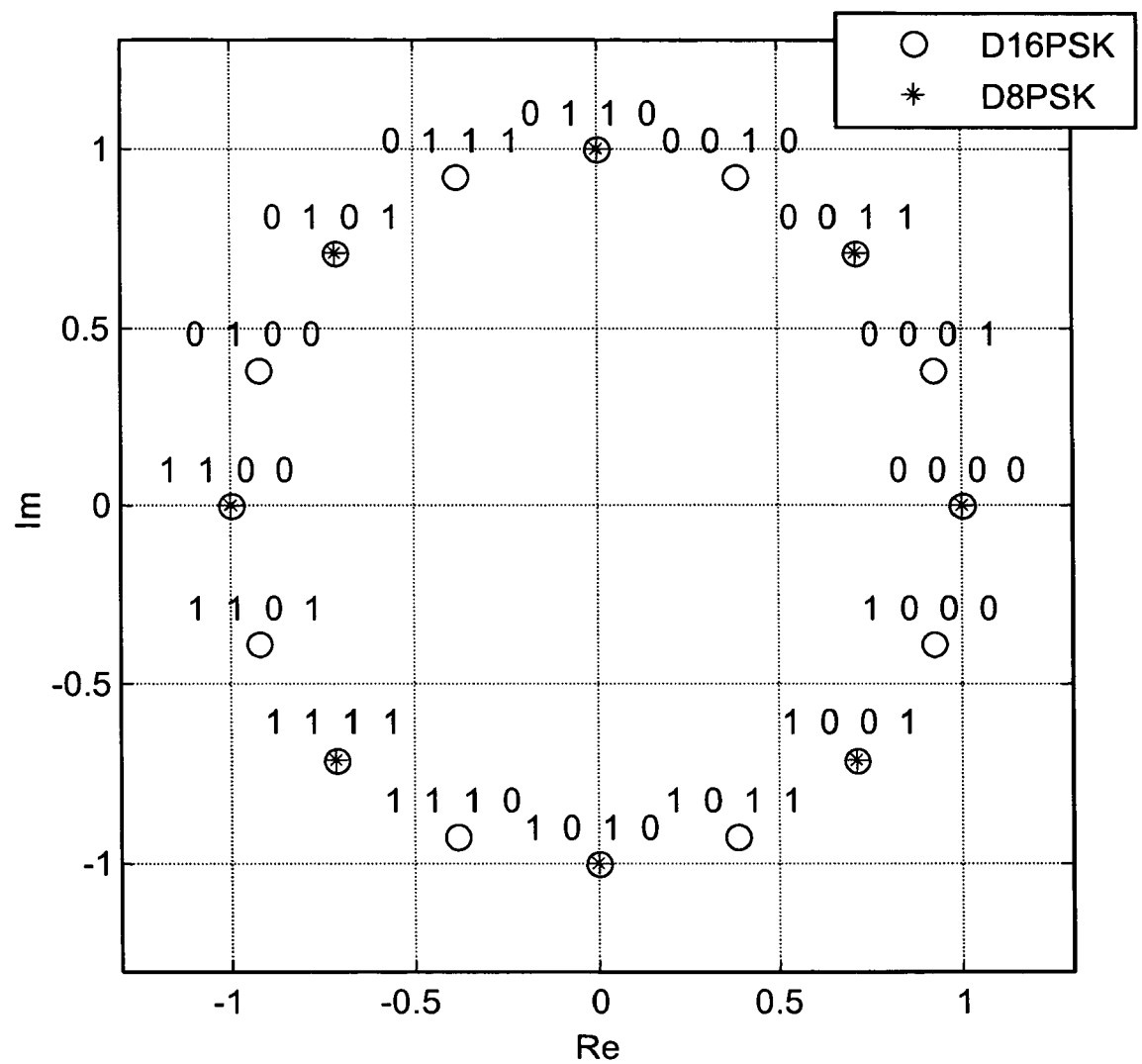
FIG. 5 is a superimposed symbol distribution constellation of the symbol distribution constellations of FIGS. 3B and 4B.

Furthermore, refer to FIG. 5. FIG. 5 is the superimposed result of FIGS. 3B and 4B.

By comparing FIGS. 3A with 4A, and comparing FIGS. 3B with 4B, it is evident that, the symbol distribution constellation obtained by means of D8PSK is a portion of that obtained by means of D16PSK, and the rest portion can be considered as obtained by rotating the symbol distribution constellation of D8PSK by an angle of $\pi/8$. The 2 constituent D8PSK portions forming a D16PSK symbol distribution constellation match in Bit 4, Bit 3 and Bit 2 of the corresponding D16PSK constellation points. However, they differ in Bit 1 of the corresponding D16PSK constellation points.

Figure 7B:
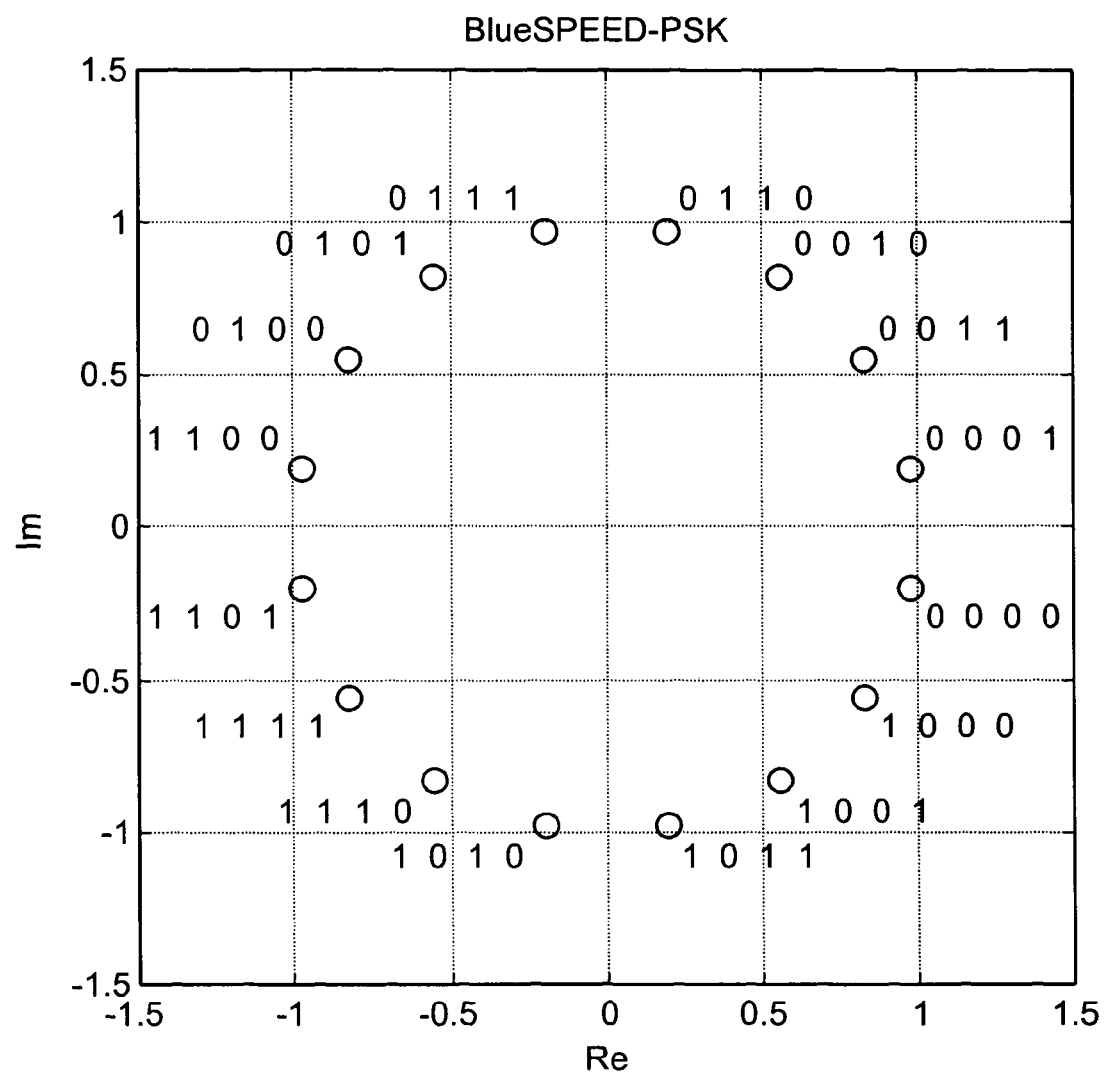
FIG. 7B is a symbol distribution constellation of the modulation technology of BlueSPEED-PSK.

Refer to FIGS. 7A and 7B. FIG. 7A is a table indicating the relations between the bits and phases of the symbols of a new PSK modulation scheme. The new scheme differs from D16PSK by having all phases are rotated by $-\pi/16$ with respect to D16PSK. FIG. 7B is a symbol distribution constellation of the new PSK modulation. The new PSK scheme will further be referred to as BlueSPEED-PSK.

Figure 8A:
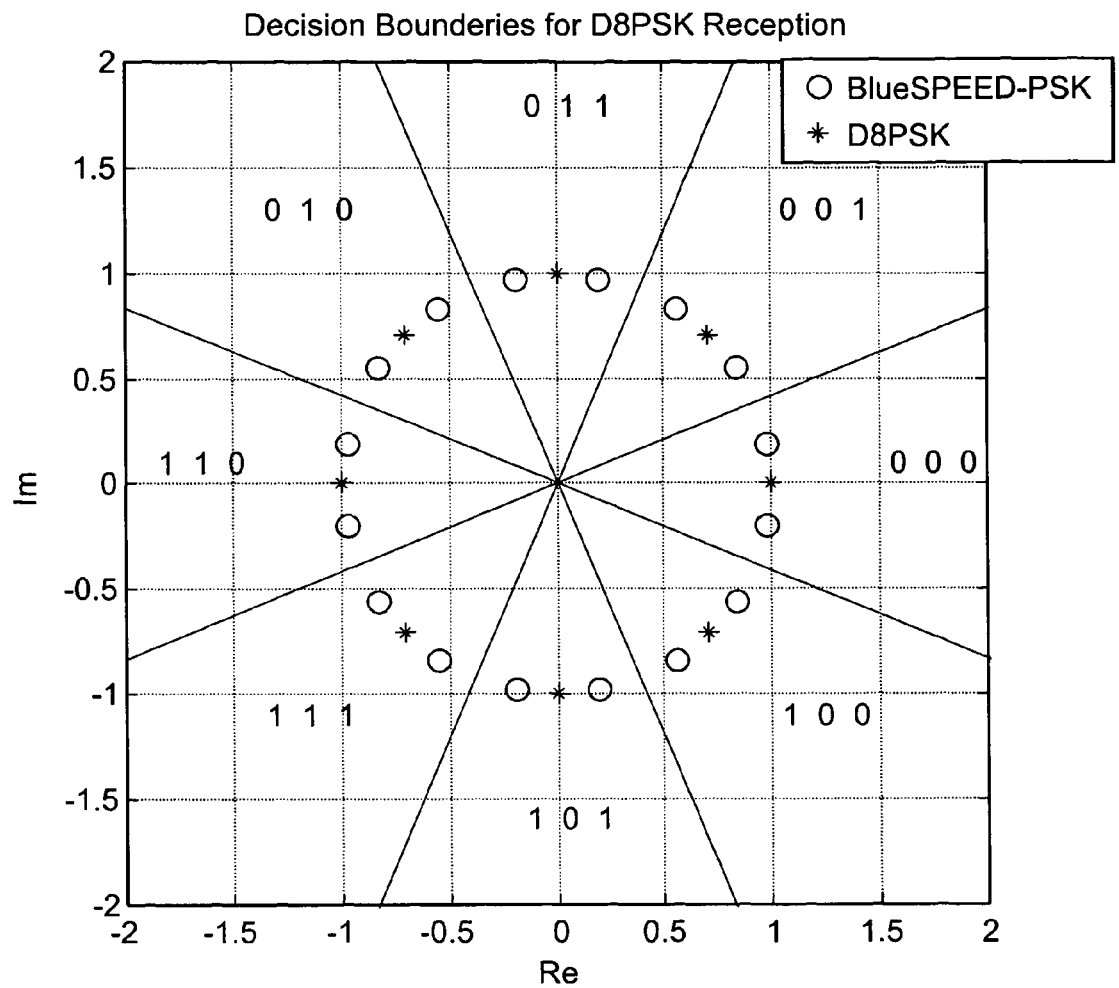
FIG. 8A is a symbol distribution constellation for the symbols of BlueSPEED communications utilizing BlueSPEED-PSK modulation, and the symbol distribution constellation of D8PSK symbols together with the decision bounderies valid for D8PSK reception and the bit combinations corresponding to each sector between the bounderies.
Figure 8B:
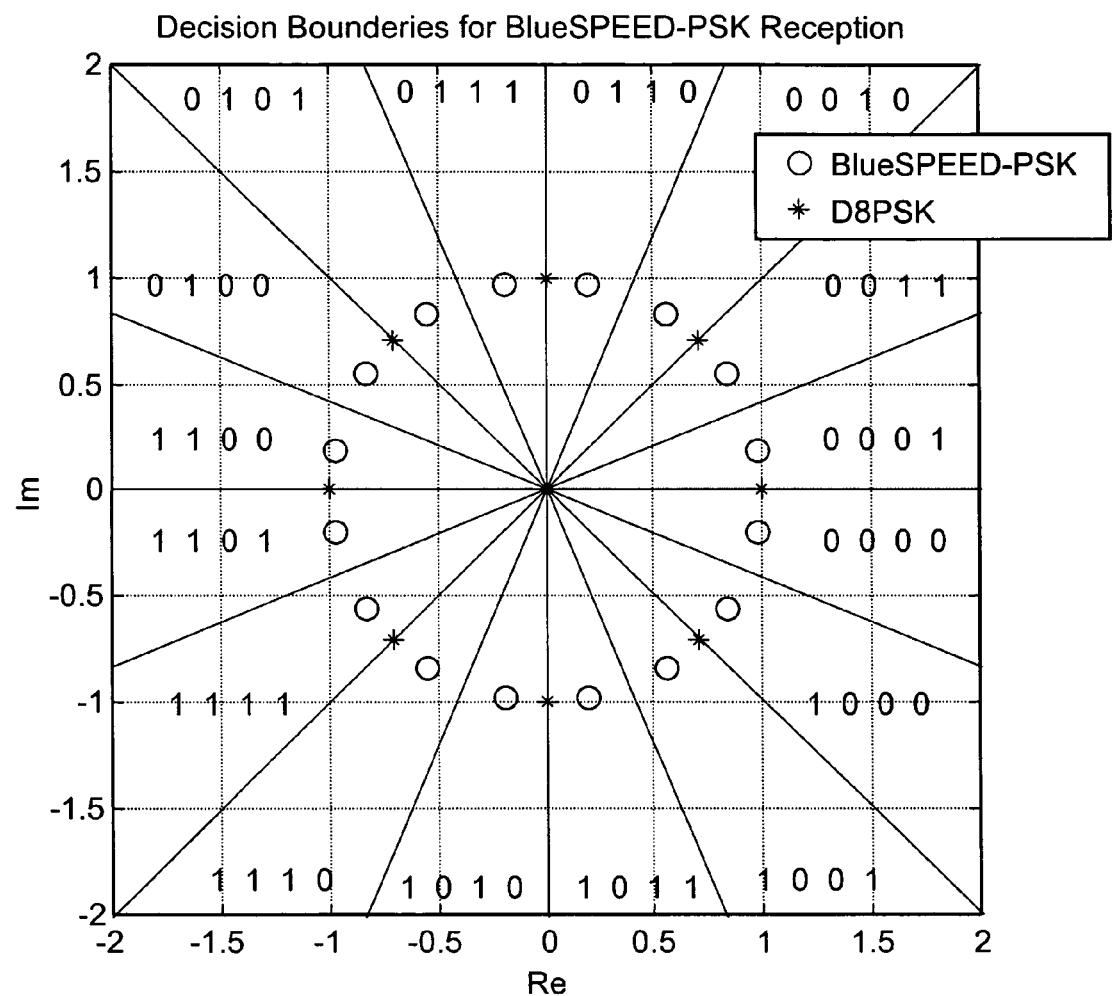
FIG. 8B is a symbol distribution constellation for the symbols of BlueSPEED communications utilizing BlueSPEED-PSK modulation, and the symbol distribution constellation of D8PSK symbols together with the decision bounderies valid for BlueSPEED-PSK reception.

Furthermore, refer to FIGS. 8A and 8B. FIG. 8A is the superimposed result of FIGS. 7B (symbol distribution constellation of BlueSPEED-PSK) and 3B (symbol distribution constellation of D8PSK). FIG. 8A contains as well the decision bounderies applied for demodulation of D8PSK. The decision bounderies partition the complex plane into 8 sectors. A received symbol will be assigned the 3-bit combination of the sector it falls into. FIG. 8B is again the superimposed result of FIGS. 7B (symbol distribution constellation of BlueSPEED-PSK) and 3B (symbol distribution constellation of D8PSK). FIG. 8B contains as well the decision bounderies applied for demodulation of BlueSPEED-PSK. The decision bounderies partition the complex plane into 16 sectors. A received symbol will be assigned the 4-bit combination of the sector it falls into. When comparing FIGS. 8A and 8B, it becomes obvious that 1 sector of D8PSK corresponds to (or covers) 2 sectors of BlueSPEED-PSK. The two 4-bit symbols of BlueSPEED-PSK corresponding to one 3-bit symbol of D8PSK differ only in Bit 1 (LSB). It follows that a received BlueSPEED-PSK transmission can be demodulated using BlueSPEED-PSK demodulation which yields a 4-bit symbol which can be interpreted as 4 bits of information. Further, a received BlueSPEED-PSK transmission can be demodulated using D8PSK demodulation which yields a 3-bit symbol which can be interpreted as 3 bits of information. The 3 bits obtained by D8PSK demodulation equal the 3 MSBs of the 4 bits obtained by BlueSPEED-PSK demodulation.

Figure 6A:
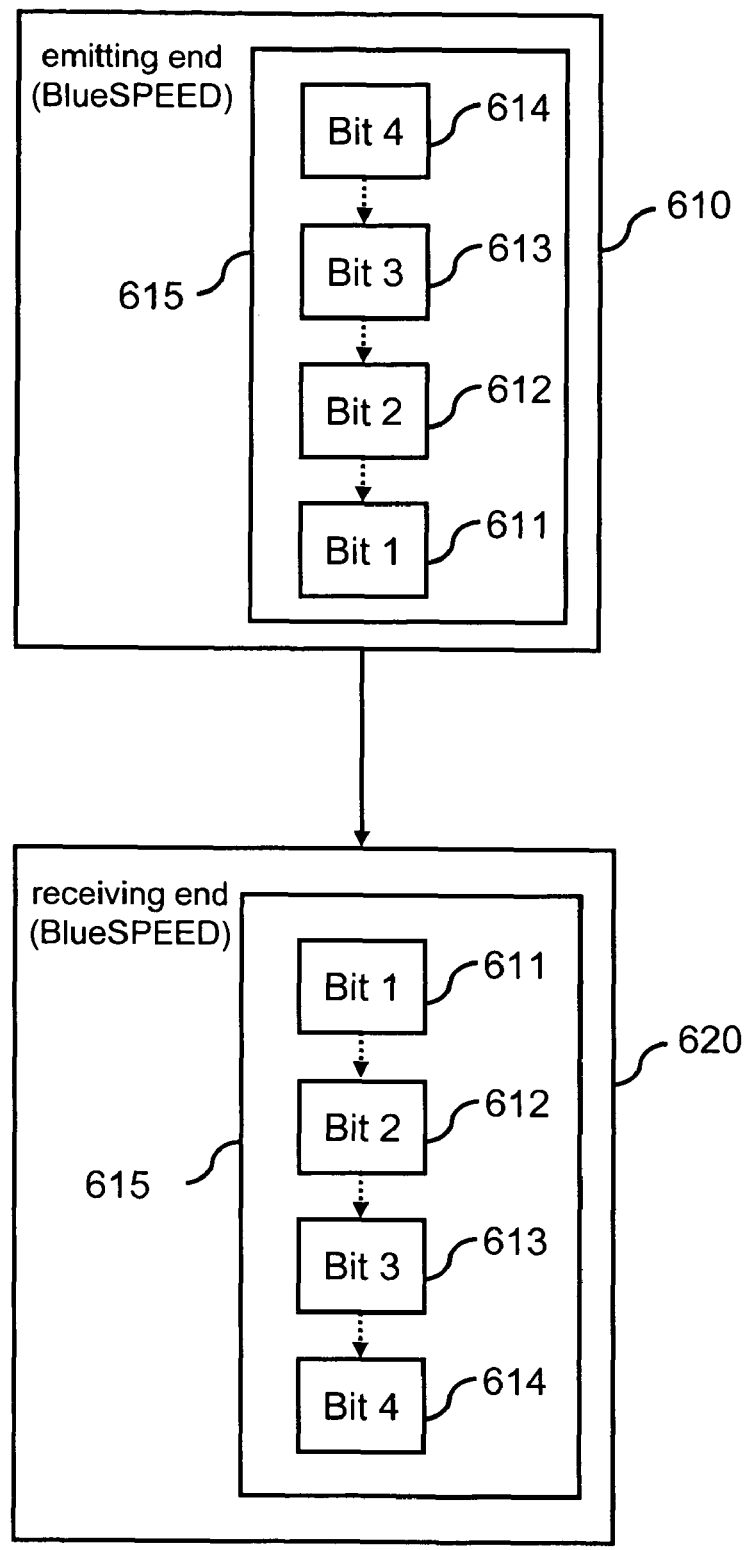
FIG. 6A is a schematic diagram of symbol transmission according to the first embodiment of the present invention.

Referring to FIG. 6A, it is a schematic diagram of symbol transmission according to the first embodiment of the invention. The meaning of the symbol transmission can be appreciated more thoroughly by referring to the system of FIG. 1A. In the first embodiment, the BlueSPEED modulation technology (BlueSPEED-PSK modulation) is utilized at the emitting end 610, while the BlueSPEED demodulation technology (BlueSPEED-PSK demodulation) is utilized at the receiving end 620. Since both ends utilize the BlueSPEED technology, the data packets received at the receiving end 620 as transmitted from the emitting end 610 can be fully demodulated without any difficulties. As shown in FIG. 6A, the 4-bit symbol 615 is formed by the consecutive four bits in the bit stream at the emitting end 610 and it includes Bit 1 (611), Bit 2 (612), Bit 3 (613), and Bit 4 (614). Then, refer to FIGS. 7A and 7B, search and obtain the phase information corresponding to the 4-bit symbol 615 according to BlueSPEED-PSK. For instance, in case the values of Bit 1 (611), Bit 2 (612), Bit 3 (613), and Bit 4 (614) of the 4-bit symbol 615 are sequentially as 0,0,1,1, then its corresponding phase is $+15\pi/16$. Then, at emitting end 610, the data packets containing the phase information corresponding to the 4-bit symbol 615 are transmitted, which are the signal waves of different phases transmitted according to the respective phase information. Afterwards, at the receiving end 620, receive and demodulate the data packets transmitted from the emitting end. Firstly, upon receiving the data packets, the respective phase information contained therein can be obtained. Next, obtain the symbol corresponding to the phase information by making use of BlueSPEED-PSK as shown in FIGS. 7A and 7B. Thus, in case the phase of the symbol received is $+5\pi/16$, then the values of Bit 1 (611), Bit 2 (612), Bit 3 (613), and Bit 4 (614) of the received 4-bit symbol 615 are 0,1,0,0 respectively. Thus, in case of a positive identification of a BlueSPEED transmission, the 4 bits in the 4-bit symbol 615 are all utilized to indicate a major message. As such, the data transmission speed can be raised to 4 Mbps.

Figure 6B:
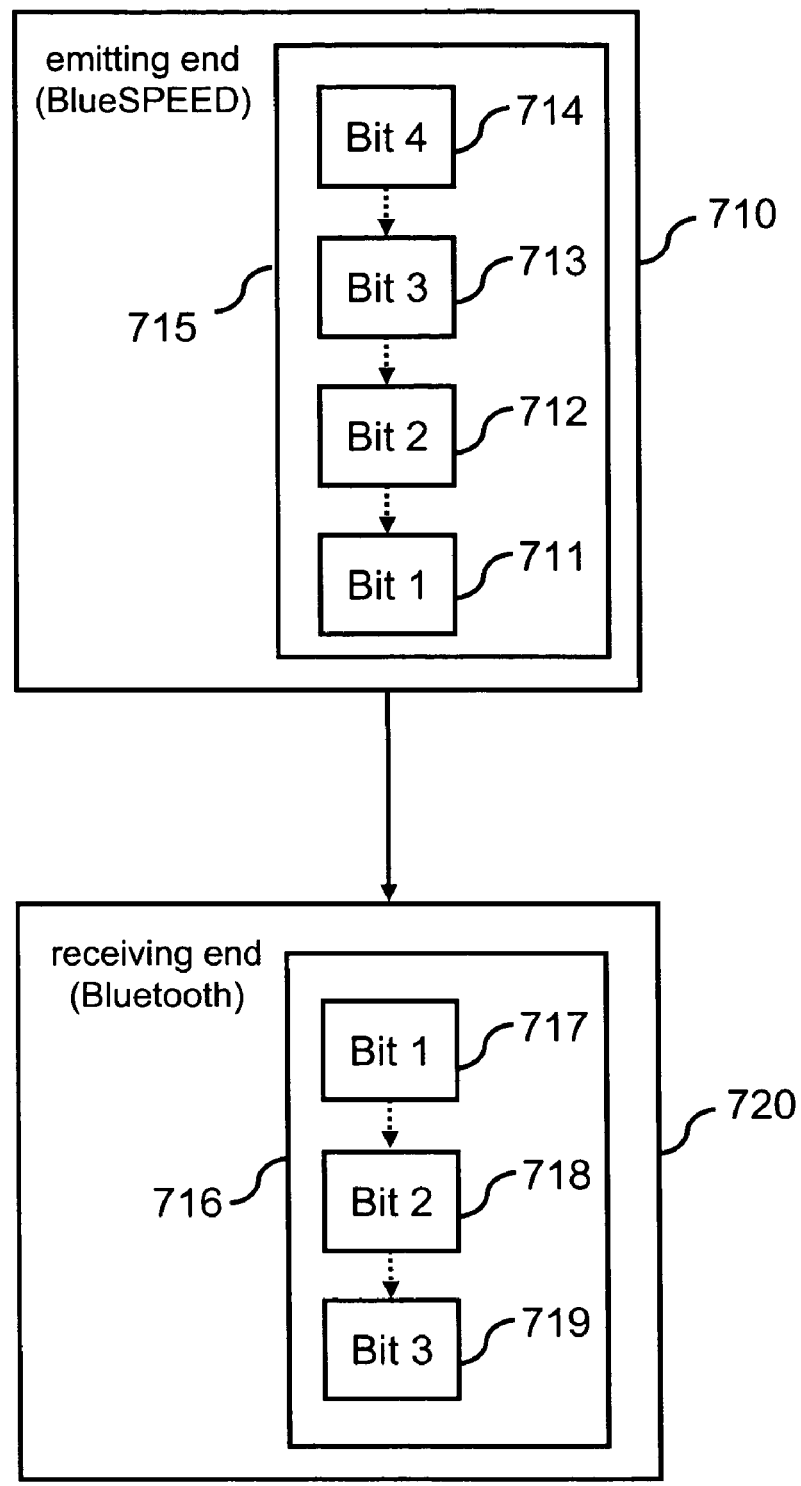
FIG. 6B is a schematic diagram of symbol transmission according to the second embodiment of the present invention.

Subsequently, referring to FIG. 6B, it is a schematic diagram of symbol transmission according to the second embodiment of the present invention. The meaning of the symbol transmission can be appreciated more thoroughly by referring to the system of FIG. 1B. In the second embodiment, the BlueSPEED modulation technology is utilized at the emitting end 710, namely, the BlueSPEED-PSK technology is utilized, while the Bluetooth modulation technology is utilized at the receiving end 720. Namely, the D8PSK technology is utilized. As shown in FIG. 6B, the 4-bit symbol 715 formed by the consecutive four bits in the bit stream at the emitting end 710 includes Bit 1 (711), Bit 2 (712), Bit 3 (713), and Bit 4 (714). Then, refer to FIGS. 7A and 7B, search and obtain the phase information corresponding to the 4-bit symbol 715 according to BlueSPEED-PSK. For instance, refer to FIGS. 7A and 7B, in case the values of Bit 1 (711), Bit 2 (712), Bit 3 (713), and Bit 4 (714) of the 4-bit symbol 715 are sequentially as 0,0,1,1, then its corresponding phase is $-15\pi/16$, while, in case the values of Bit 1 (711), Bit 2 (712), Bit 3 (713), and Bit 4 (714) of the 4-bit symbol 715 are sequentially as 1,0,1,1, its corresponding phase is $+15\pi/16$. Both 4-bit example symbols differ only in Bit 1, i.e. the LSB. Then, at emitting end 710, the data packets containing the phase information corresponding to the 4-bit symbol 715 are transmitted, which are the signal waves of different phases transmitted according to the respective phase information. Afterwards, at the receiving end 720, receive and demodulate the data packets transmitted from the emitting end. Firstly, upon receiving the data packets, the respective phase information contained therein can be obtained. Next, obtain the symbol corresponding to the phase information by making use of D8PSK as shown in FIGS. 3A and 3B. Thus, in case the phase of the symbol received is $+15\pi/16$, then the values of Bit 1 (717), Bit 2 (718) and Bit 3 (719) of the received 3-bit symbol 716 are 0,1,1 respectively. In case the phase of the symbol received is $-15\pi/16$, then the values of Bit 1 (717), Bit 2 (718) and Bit 3 (719) of the received 3-bit symbol 716 are 0,1,1 respectively. In both cases, Bit 1 (717), Bit 2 (718) and Bit 3 (719) correspond to Bit 2 (712), Bit 3 (713) and Bit 4 (714) of the transmitted 4-bit symbol. With regards to the transmitted 4-bit symbol, Bit 1 (711) could not be recovered. As such, the data transmission speed is only 3 Mbps. In the above description, the essence of information is placed in Bit 2 (712), Bit 3 (713), and Bit 4 (714). As such, at the receiving end 720, the demodulated signals are correct and the same as the originally transmitted signal. In the invention, the receiving end 720 utilized is the Bluetooth receiver known in the prior art, which can be utilized to receive data correctly without having to make any adjustment.

Figure 6C:
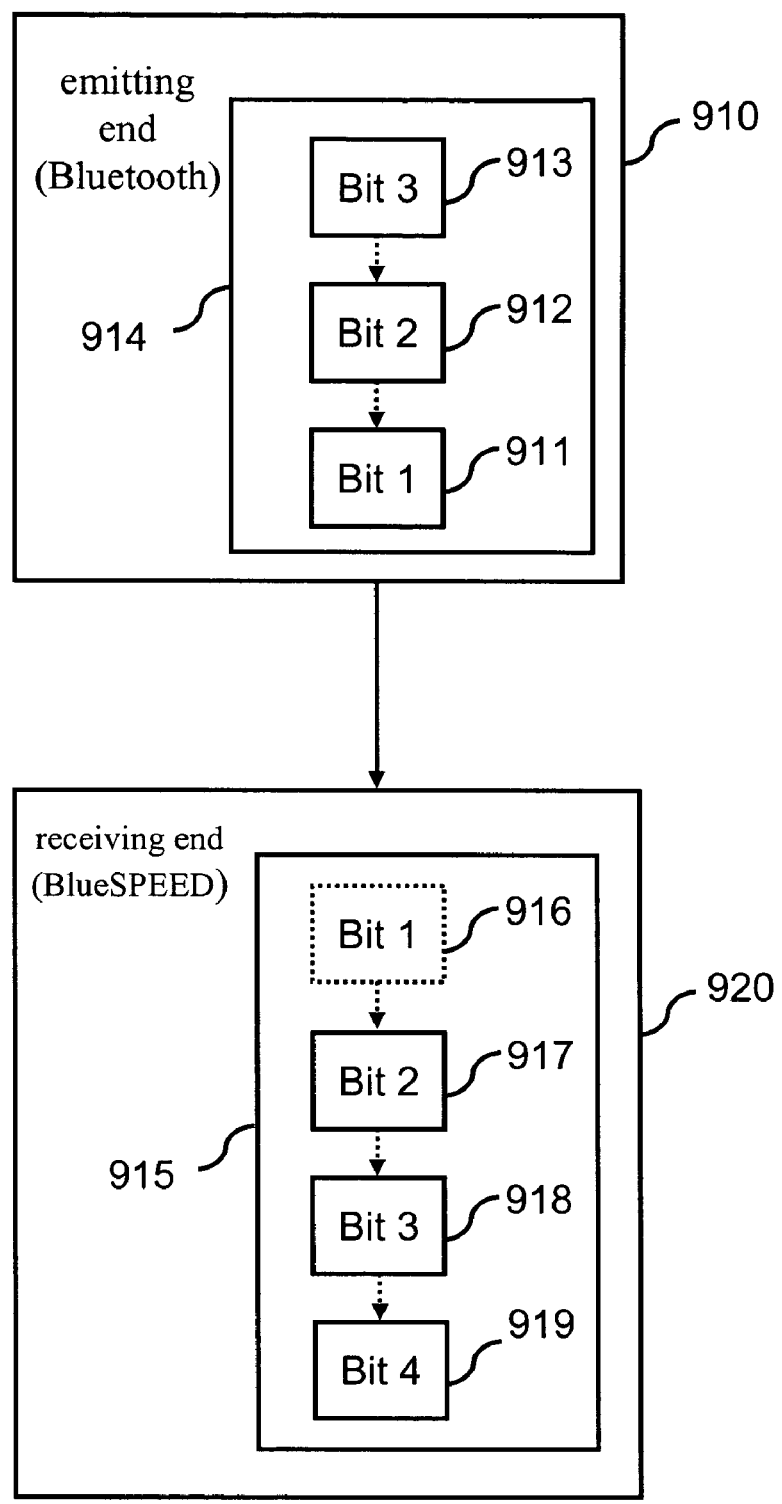
FIG. 6C is a schematic diagram of symbol transmission according to the third embodiment of the present invention.

Finally, referring to FIG. 6C, it is a schematic diagram of symbol transmission according to the third embodiment of the present invention, which can be appreciated more thoroughly in conjunction with the system of FIG. 1C, wherein the Bluetooth modulation technology is utilized at the emitting end 910, while the BlueSPEED demodulation technology is utilized at the receiving end 920, namely, the BlueSPEED-PSK technology is utilized. As shown in FIG. 6C, the 3-bit symbol 914 is formed by the consecutive 3 bits in a-bit stream at the emitting end 910 includes Bit 1 (911), Bit 2 (912), and Bit 3 (913). Then, search and obtain the phase information corresponding to the 3-bit symbol 914 according to D8PSK, as shown in FIGS. 3A and 3B. For instance, in case the values of Bit 1 (911), Bit 2 (912), and Bit 3 (913) of the 3-bit symbol 914 are sequentially as 0,0,1, its corresponding phase is $-1\pi/4$. Then, at the emitting end 910, the data packets containing the phase information corresponding to the 3-bit symbol 914 are transmitted, which are the signal waves of different phases, according to the respective phase information. Afterwards, at the receiving end 920, receive and demodulate the data packets transmitted from the emitting end. Firstly, upon receiving the data packets, the respective phase information contained therein can be obtained. Next, obtain the symbol corresponding to the phase information by making use of BlueSPEED demodulation technology as shown in FIGS. 7A and 7B. Thus, in case the phase of the symbol received is $-4\pi/16$, then the values of Bit 1 (916), Bit 2 (917), Bit 3 (918), and Bit 4 (919) of the received 4-bit symbol 915 are either 0,0,0,1 or 1,0,0,1 respectively (see FIG. 8A and 8B). Thus, in case of a negative identification of a BlueSPEED transmission, only 3 bits of the 4-bit symbol 915 are utilized. Bit 1 (916) is omitted yielding 0,0,1 as the correctly received message. As such, the data transmission speed is 3 Mbps.

Figure 6D:
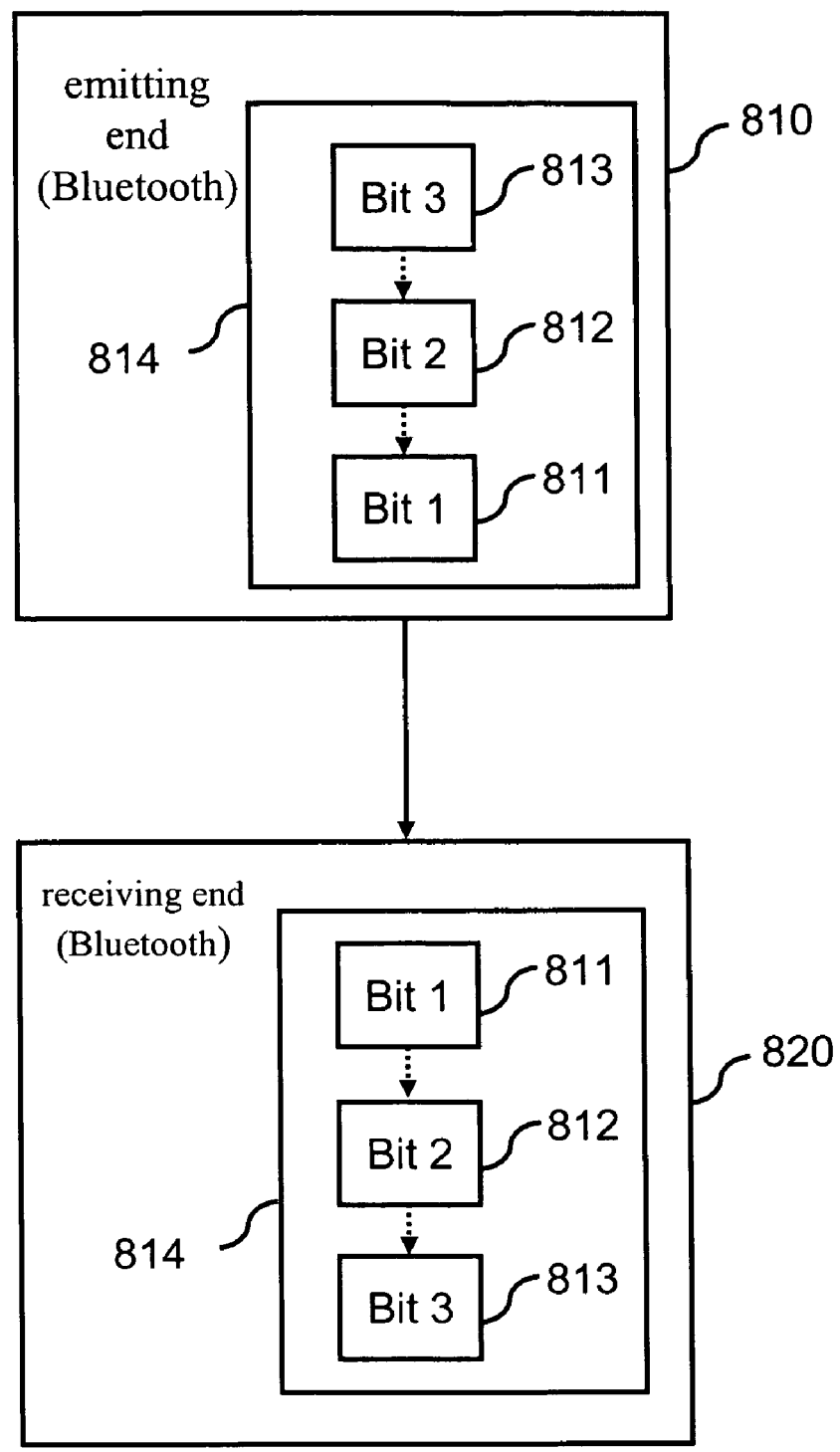
FIG. 6D is a schematic diagram of symbol transmission related to the present invention.

Referring to FIG. 6D, it is a schematic diagram of symbol transmission related to the present invention, which can be appreciated more thoroughly in conjunction with the system of FIG. 1D, wherein the Bluetooth modulation technology is utilized at the emitting end 810, and the Bluetooth demodulation technology is utilized at the receiving end 820, Namely, the D8PSK technology is utilized. The resulting data transmission speed is 3 Mbps.

Refer again to FIGS. 1A and 2B which represent the first embodiment of the present invention, wherein BlueSPEED technology is utilized at an emitting end 110 as a modulating means and BlueSPEED technology is utilized at a receiving end 112 as a de-modulating means. Refer also to FIGS. 1B and 2C which represent the second embodiment of the present invention, wherein BlueSPEED technology is utilized at an emitting end 120 as a modulating means and D8PSK is utilized at a receiving end 122 as a de-modulating means. In order to optimally facilitate the reception of the signal of an emitting end 110 (performing BlueSPEED-PSK modulation) by a receiving end 112 (performing BlueSPEED-PSK demodulation), and in order to optimally facilitate the reception of the signal of an emitting end 120 (performing BlueSPEED-PSK modulation) by a receiving end 122 (performing D8PSK demodulation), another BlueSPEED modulation technology, namely BlueSPEED-DELTA-PSK modulation is introduced.

Figure 9A:
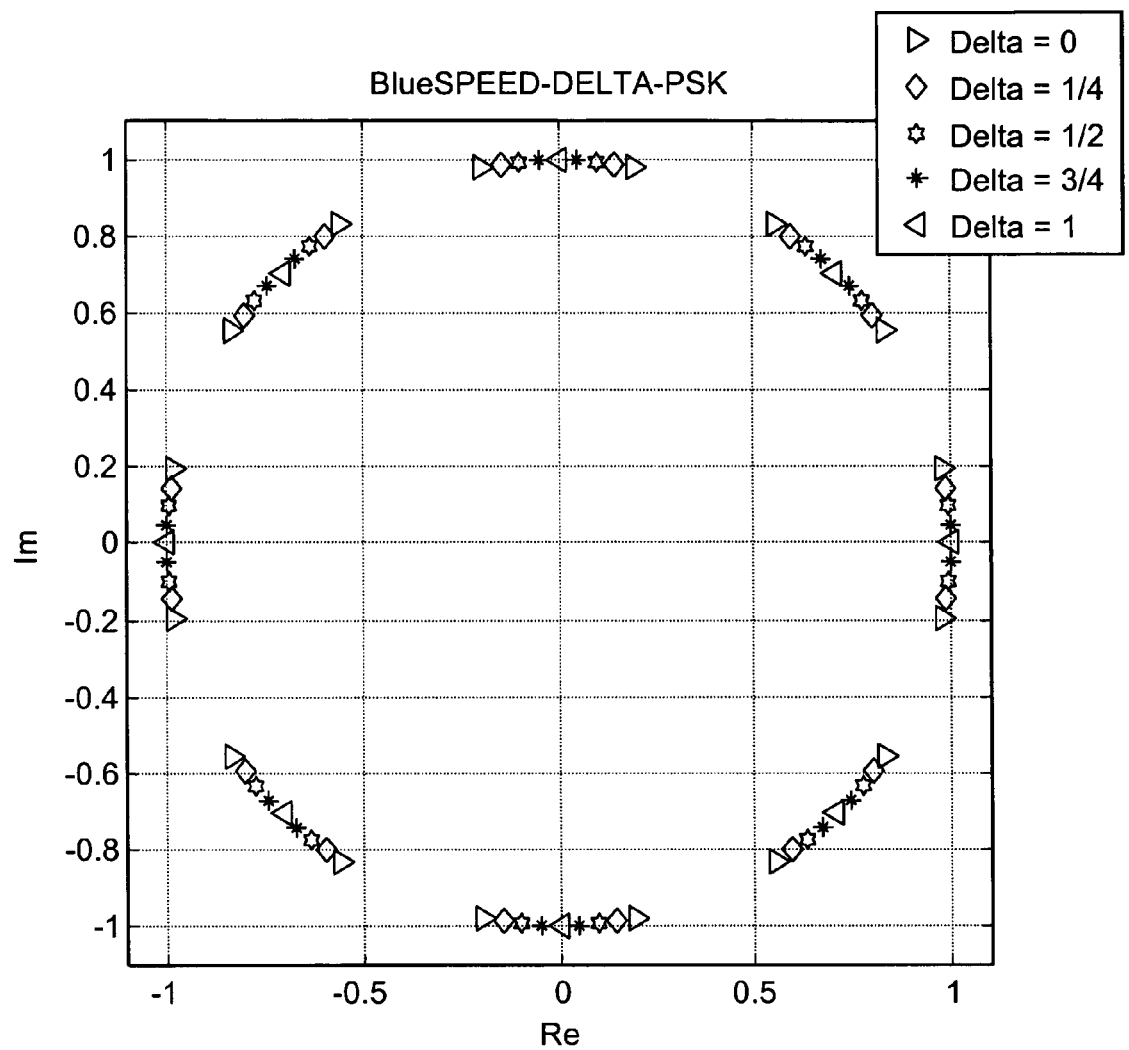
FIG. 9A is a symbol distribution constellation for the symbols of the BlueSPEED modulation technology of BlueSPEED-DELTA-PSK.
Figure 9B:
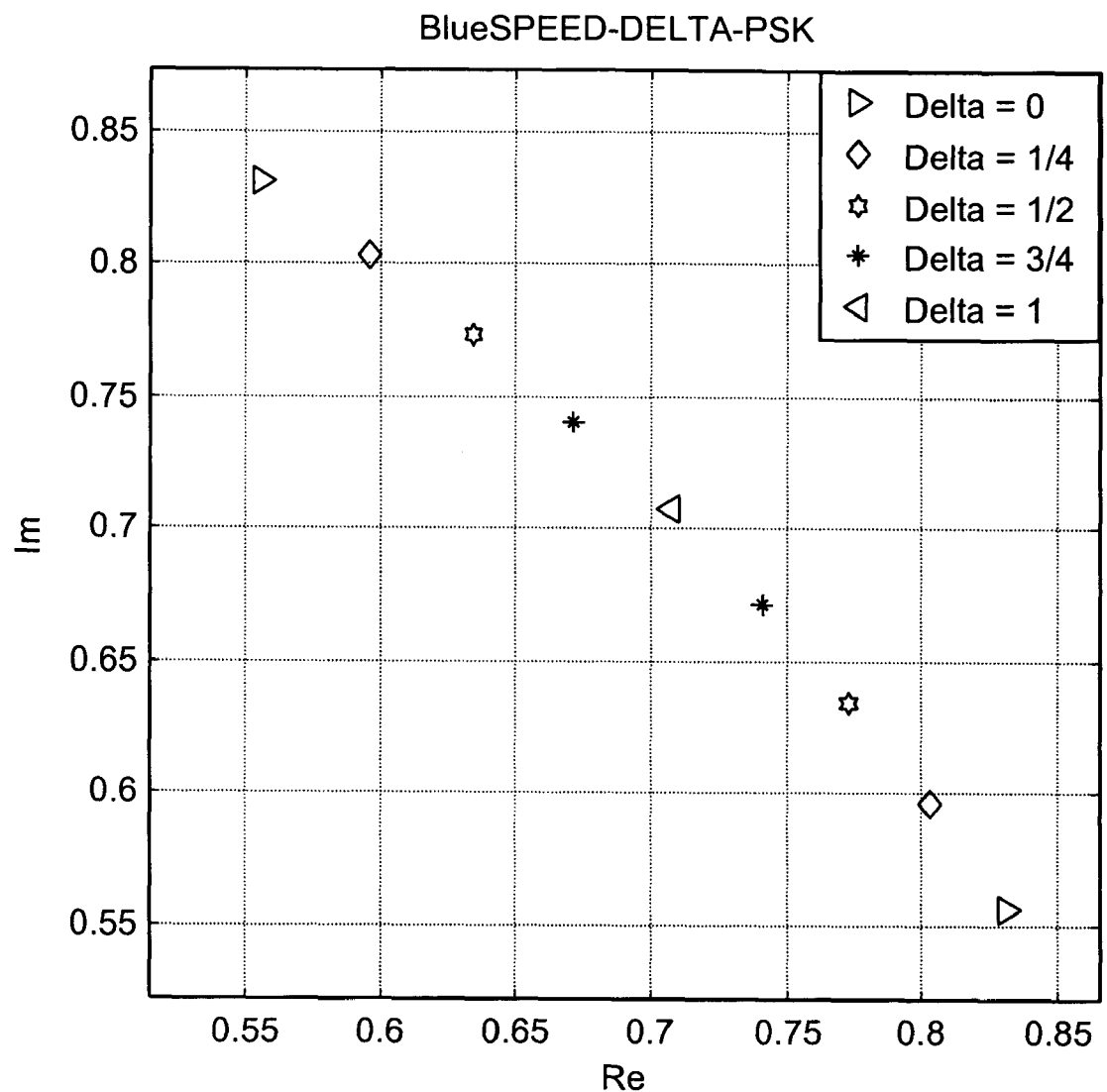
FIG. 9B is an enlarged view of a portion of the BlueSPEED-DELTA-PSK symbol distribution constellation shown in FIG. 9A.

Referring to FIG. 9A, it is a symbol distribution constellation of the BlueSPEED-DELTA-PSK modulation. Referring to FIG. 9B, it is a detailed view of the symbol distribution constellation of the BlueSPEED-DELTA-PSK modulation. The scheme differs from BlueSPEED-PSK by having an additional parameter Delta. The parameter Delta refers to an position adjustment of constellation points which sets constellation points having the same 3 MSB bits (Bit 4, Bit 3 and Bit 2 in FIG. 7A) closer to each other. The position adjustment is expressed in fractions of $\pi/16$. The parameter Delta has a valid range of all fractional numbers between 0 and 1, including 0 and 1. For Delta =0, the BlueSPEED-DELTA-PSK symbol distribution constellation equals the BlueSPEED-PSK symbol distribution constellation (see FIG. 7B). For Delta =0, the transmission performance of the first embodiment of the present invention achieves optimum performance. For Delta =1, the BlueSPEED-DELTA-PSK symbol distribution constellation points match the D8PSK symbol distribution constellation points (see FIG. 3B). For Delta =1, the transmission performance of the second embodiment of the present invention achieves optimum performance.

Refer to FIG. 9C, it is a table indicating the (exemplary) relations between the bits and phases of the symbols of the BlueSPEED-DELTA-PSK modulation scheme for the (exemplary) parameter setting Delta =½.

Figure 10A:
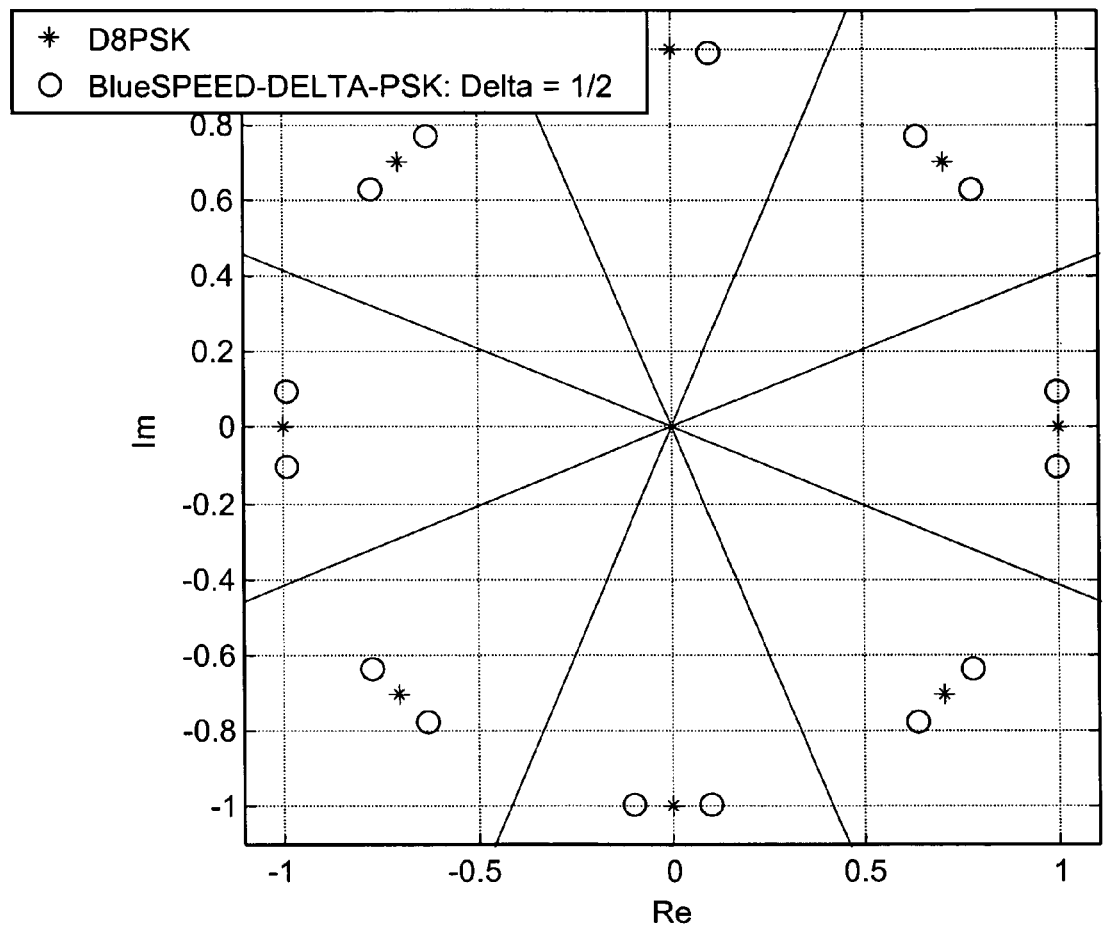
FIG. 10A is a symbol distribution constellation for the symbols of BlueSPEED communications utilizing BlueSPEED-DELTA-PSK modulation (Delta =½), and the symbol distribution constellation of D8PSK symbols together with the decision bounderies valid for D8PSK reception.

Furthermore, refer to FIG. 10A. FIG. 10A is the superimposed result of FIG. 3B (symbol distribution constellation of D8PSK) and the symbol distribution constellation of the BlueSPEED-DELTA-PSK modulation scheme for the parameter setting Delta =½. FIG. 10A contains as well the decision bounderies applied for demodulation of D8PSK. Furthermore, refer to FIGS. 8A and FIG. 10A. A comparison demonstrates that the demodulation of a BlueSPEED-DELTA-PSK-modulated signal using D8PSK demodulation (corresponds to second embodiment of the present invention) is improved for Delta >0 (versus using Delta =0) because the transmitted BlueSPEED-DELTA-PSK constellation points are now placed closer to the corresponding D8PSK constellation point, i.e. they are now placed further away from the corresponding D8PSK decision bounderies.

Figure 10B:
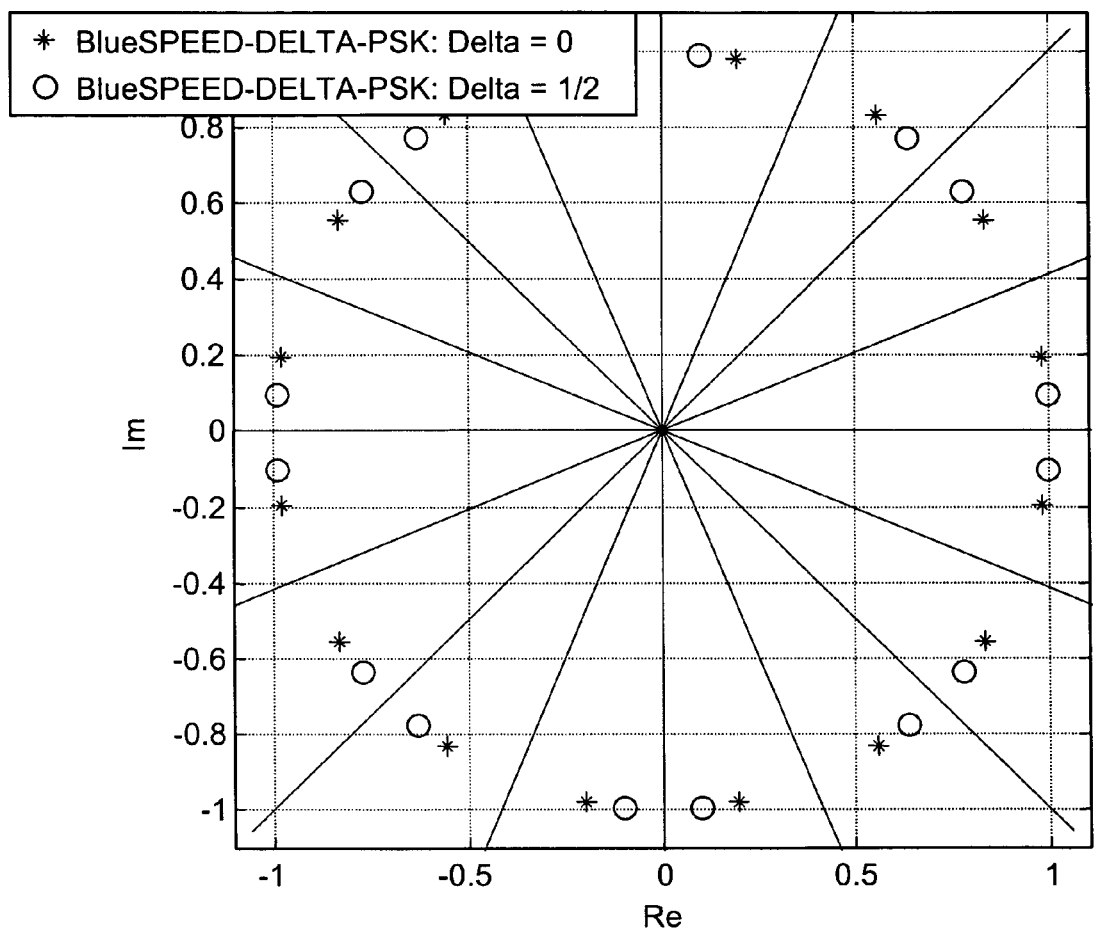
FIG. 10B is a symbol distribution constellation for the symbols of BlueSPEED communications utilizing BlueSPEED-DELTA-PSK modulation for Delta =½, and the symbol distribution constellation for the symbols of BlueSPEED communications utilizing BlueSPEED-DELTA-PSK modulation for Delta =0 together with the decision bounderies valid for BlueSPEED-PSK/BlueSPEED-DELTA-PSK reception.

Furthermore, refer to FIG. 10B. FIG. 10B is the superimposed result of FIG. 9A (symbol distribution constellation of BlueSPEED-DELTA-PSK for Delta =0) and of FIG. 9A (symbol distribution constellation of BlueSPEED-DELTA-PSK for Delta =½). FIG. 10B contains as well the decision bounderies applied for demodulation of BlueSPEED-DELTA-PSK. A comparison of the two symbol distribution constellations demonstrates that a demodulation of a BlueSPEED-DELTA-PSK-modulated signal using BlueSPEED-DELTA-PSK demodulation (corresponds to first embodiment of the present invention) is degraded for Delta >0 (versus using Delta =0) because the transmitted BlueSPEED-DELTA-PSK constellation points for Delta >0 are placed off the center position between the corresponding BlueSPEED-DELTA-PSK decision bounderies.

The parameter Delta allows balancing the demodulation performance of a receiving end 112 of the first embodiment of the present invention versus the demodulation performance of a receiving end 122 of the second embodiment of the present invention using the same emitting end 110/120.

Refer to FIGS. 6A, 6B, 6C, 6D. The additional Bit 1 (611 and 711) which can be transmitted by emitting end 610 (corresponding to first embodiment of the present invention) and 710 (corresponding to second embodiment of the present invention), in contrast to emitting ends 810 and 910, can be utilized to add Forward Error Correction (FEC) to the transmission. Since 1 additional bit (Bit 1) is available for FEC for every 3 bit of information data (Bit 2 (612 or 712), Bit 3 (613 or 713) and Bit 4 (614 or 714)), an error correction code of code rate ¾ is utilized. To keep latency in the FEC processing to a minimum, a block error correction code is utilized. Therefore, Bit 1 (611 or 711) may be used for FEC using a Bose Chaudhuri Hocquenghem Code (BCH code) with an information word size of 36 bits, a code word size of 48 bits and the capability of correcting 2 reception errors: BCH(48,36,2). Thus, the data transmitted from the BlueSPEED emitting end 610 or 710 can be more securely protected. If Bit 1 in the first embodiment of the present invention is used for FEC, then the resulting cross transmission speed (Bit 1, Bit 2, Bit 3 and Bit 4) is 4 Mbps, but the actual net transmission speed of the more robust transmission (Bit 2, Bit 3 and Bit 4) is 3 Mbps. If Bit 1 in the second embodiment of the present invention is used for FEC, then the emitting end 710 sends Bit 1, Bit 2, Bit 3 and Bit 4 at 4 Mbps, but the receiving end 720 can not exploit the parity information in Bit 1. The transmission speed of the transmission is 3 Mbps. No improvement in robustness is achieved.

Refer to FIGS. 6A, 6B, 6C, 6D. The additional Bit 1 (611 and 711) which can be transmitted by emitting end 610 (corresponding to first embodiment of the present invention) and 710 (corresponding to second embodiment of the present invention), in contrast to emitting ends 810 and 910, can be utilized to add incremental information (e.g. higher resolution color information for an image, higher resolution pixel information for an image, higher precision information for audio) to the transmission. Thus, the data transmitted from the BlueSPEED emitting end 610 or 710 can be of increased quality. If Bit 1 in the first embodiment of the present invention is used for quality increase, then the resulting transmission speed (Bit 1, Bit 2, Bit 3 and Bit 4) is 4 Mbps. If Bit 1 in the second embodiment of the present invention is used for quality increase, then the emitting end 710 sends Bit 1, Bit 2, Bit 3 and Bit 4 at 4 Mbps, but the receiving end 720 can not exploit the quality upgrade information in Bit 1. The transmission speed of the transmission is 3 Mbps. No improvement in quality is achieved.

Refer to FIGS. 2B and 2D for flowcharts of the first and third embodiment of the present invention. The receiving end 240 includes a processing step for identifying a BlueSPEED-PSK/BlueSPEED-DELTA-PSK transmission (243b and 249b). The identification is based on a Cyclic Reduncancy Check (CRC). The CRC is applied to a block of information data transmitted using the Bit 1 bits (611 and 711) by the emitting ends using BlueSPEED technology (615 and 715). A 4-bit CRC is proposed for the emitting ends using BlueSPEED technology (615 and 715). A receiving end using BlueSPEED technology (615 and 915) will evaluate the CRC provided by the received (BlueSPEED-PSK/BlueSPEED-DELTA-PSK-demodulated) Bit 1 bits (611 and 916). For the first embodiment of the present invention (and under suitable radio transmission conditions), the CRC will pass and the received signal will be positively identified as a BlueSPEED-PSK/BlueSPEED-DELTA-PSK-modulated signal. For the third embodiment of the present invention (and irrespective of radio transmission conditions), the CRC will fail and the received signal will not be identified as a BlueSPEED-PSK/BlueSPEED-DELTA-PSK-modulated signal.

In the present invention, a method is disclosed for enhancing the Bluetooth transmission speed and robustness of an emitting end and a receiving end of a communication system, which either is to increase the data transmission speed, or to raise the robustness of the data transmission.

Therefore, through the application of the method of the invention, the speed or robustness of data transmission can be raised, hereby improving the amount of information transmitted or reducing the probability of error of data transmission.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for enhancing Bluetooth transmission speed and robustness of an emitting end and a receiving end of a communication system, wherein at least one of the emitting and receiving ends is provided with BlueSPEED technology: BlueSPEED-PSK/BlueSPEED-DELTA-PSK (Pulse Shift Keying), wherein in case that BlueSPEED technology is utilized at the emitting and receiving ends, the method includes the following steps:

modulating a bit stream of a plurality of bits at the emitting end, which comprises the steps of:

forming 4-bit symbols sequentially from every consecutive 4 bits in the bit stream, searching and obtaining the phase information corresponding to the respective 4-bit symbols according to the BlueSPEED-PSK or BlueSPEED-DELTA-PSK, and forming data packets containing the respective phase information;

transmitting the data packets at the emitting end;

receiving the data packets at the receiving end; and de-modulating the data packets at the receiving end, which includes the steps of:

reading the respective phase information in the data packet, searching and obtaining the 4-bit symbols corresponding to the respective phase information according to BlueSPEED-PSK or BlueSPEED-DELTA-PSK, interpreting the 4 bits contained in the respective 4-bits symbols, and identifying BlueSPEED-PSK and BlueSPEED-DELTA-PSK transmission using (4-bits) CRC (cyclic redundancy check) applied to blocks of bits formed by every 4th bit in the bit stream.

2. The method for enabling Bluetooth transmission of an emitting end and a receiving end of a communication system as claimed in claim 1, wherein the BlueSPEED-PSK is a Gray-coded Differentially 16-Phase Shift Keying (D16PSK) modulation, D16PSK being Pulse Shift Keying rotated by $-\pi/16$.

3. The method for enabling Bluetooth transmission of an emitting end and a receiving end of a communication system as claimed in claim 1, further comprising:

before the step of forming 4-bits symbols sequentially from every consecutive 4 its in the bit stream, applying a (4-bits) CRC (cyclic redundancy check) to a block of bits formed by every 4th bit in the bit stream.

4. The method for enabling Bluetooth transmission of an emitting end and a receiving end of a communication system as claimed in claim 1, further comprising:

before the step of forming 4-bits symbols sequentially from every consecutive 4 bits in the bit stream, applying a BCH(48,36,2)(Bose Chaudhuri Hocquenghem) code to a block of bits formed by every 4th bit in the bit stream.

5. A method for enabling Bluetooth transmission of an emitting end and a receiving end of a communication system, wherein in case that BlueSPEED technology of BlueSPEED-PSK (Pulse Shift Keying) or BlueSPEED-DELTA-PSK modulation is utilized at the emitting end, and the technology of D8PSK is utilized at the receiving end, the method includes the following steps:

modulating a bit stream of a plurality of bits at the emitting end, comprising the following steps:

forming 4-bits symbols sequentially from every consecutive 4 bits in the bit stream;

searching and obtaining the phase information corresponding to the respective 4-bits symbols according to the BlueSPEED-PSK or BlueSPEED-DELTA-PSK; and forming data packets containing the respective phase information;

transmitting the data packets at the emitting end;

receiving the data packets at the receiving end; and de-modulating the data packets at the receiving end, including the following steps:

reading the respective phase information in the data packet;

searching and obtaining the 3-bit symbols corresponding to the respective phase information according to the D8PSK, the respective 3-bit symbols are composed of 3 bits; and interpreting the 3 bit contained in the respective 3-bit symbols;

wherein the 3 bit in the respective 3-bit symbols are the same as the 3 MSB bits of the respective 4-bits symbols transmitted by the emitting end.

6. The method for enabling Bluetooth transmission of an emitting end and a receiving end of a communication system as claimed in claim 5, wherein the BlueSPEED-PSK is a Gray-coded D16PSK modulation, D16PSK being Pulse Shift Keying rotated by $-\pi/16$.

7. The method for enabling Bluetooth transmission of an emitting end and a receiving end of a communication system as claimed in claim 5, further comprising:

before the step of forming 4-bits symbols sequentially from every consecutive 4 bits in the bit stream, applying a (4-bits) CRC (cyclic redundancy check) to a block a bits formed by every 4th bit in the bit stream.

8. The method for enabling Bluetooth transmission of an emitting end and a receiving end of a communication system as claimed in claim 5, further comprising:

before the step forming 4-bits symbols sequentially from every consecutive 4 bits in the bit stream, applying a BCH(48,36,2)(Bose Chaudhuri Hocquenghem) code to a block a bits formed by every 4th bit in the bit stream.

9. A method for enabling Bluetooth transmission of an emitting end and a receiving end of a communication system, wherein in case that the technology of D8PSK is utilized at the emitting end and the BlueSPEED technology (BlueSPEED-PSK or BlueSPEED-DELTA-PSK demodulation) is utilized at the receiving end of a communication system, the method of the invention includes the following steps:

modulating a bit stream of a plurality of bits at the emitting end, comprising the following steps:

forming 3-bit symbols sequentially from every consecutive 3 bit in the bit stream, searching and obtaining the phase information corresponding to the respective 3-bit symbols according to the D8PSK, and forming data packets containing the respective phase information;

transmitting the data packets at the emitting end;

receiving the data packets at the receiving end; and de-modulating the data packets at the receiving end, including the following steps:

reading the respective phase information in the data packet, searching and obtaining the 4-bits symbols corresponding to the respective phase information according to BlueSPEED-PSK or BlueSPEED-DELTA-PSK, interpreting the 4 bits contained in the respective 4-bits symbols, identifying BlueSPEED-PSK and BlueSPEED-DELTA-PSK transmission using the (4-bits) CRC applied to blocks of bits formed by every 4th bit in the bit stream, and obtaining 3 MSB bits from 4-bits symbols, wherein the obtained 3 bit from 4-bits symbols are the same as the 3 bit of the respective 3-bit symbols transmitted by the emitting end.

10. The method for enabling Bluetooth transmission of an emitting end and a receiving end of a communication system as claimed in claim 9, wherein the BlueSPEED-PSK is a Gray-coded D16PSK modulation, D16PSK being Pulse Shift Keying rotated by $-\pi/16$.

* * * * *